United States Patent [19]

Kimura et al.

[11] Patent Number: 5,511,172
[45] Date of Patent: Apr. 23, 1996

[54] SPECULATIVE EXECUTION PROCESSOR

[75] Inventors: Kozo Kimura, Osaka; Kosuki Yoshioka, Katano; Tokuzo Kiyohara, Osaka, all of Japan

[73] Assignee: Matsushita Electric Co. Ind, Ltd., Osaka, Japan

[21] Appl. No.: 977,238

[22] Filed: Nov. 16, 1992

[30] Foreign Application Priority Data

Nov. 15, 1991 [JP] Japan .................................. 3-300126

[51] Int. Cl.$^6$ .............................. G06F 9/30; G06F 9/38
[52] U.S. Cl. .................. 395/375; 364/229.2; 364/231.9; 364/259.9; 364/261.3; 364/261.5; 364/262.4; 364/263.1; 364/DIG. 1
[58] Field of Search ..................................... 395/375, 800

[56] References Cited

U.S. PATENT DOCUMENTS

| | | | |
|---|---|---|---|
| 5,127,091 | 6/1992 | Boufarah et al. | 395/375 |
| 5,151,981 | 9/1992 | Westcott et al. | 395/375 |
| 5,197,137 | 3/1993 | Kumar et al. | 395/375 |
| 5,201,057 | 4/1993 | Uht | 395/800 |

OTHER PUBLICATIONS

H. Dwyer "A Fast Instruction Dispatch Unit for Multiple and out-of-Sequence Issuances", EE-CEG-87-15.
An Extended Superscalar Processor Prototype Based on the SIMP (Single Instruction Stream/Multiple Instruction Pipelining) Architecture, Pub. in 1990.

Primary Examiner—Kevin J. Teska
Assistant Examiner—Ayni Mohamed
Attorney, Agent, or Firm—Price, Gess & Ubell

[57] ABSTRACT

The present invention discloses a speculative execution processor including a plurality of executing units for processing in parallel a plurality of instructions in an instruction sequence stored in its memory. The processor comprises an instruction type distinguishing device for distinguishing a type of a conditional branch instruction included in the unexecuted instruction sequence, the condition of the conditional branch instruction depending on another instruction, an instruction parallel-issuing device for issuing in parallel instructions included in a succeeding instruction sequence to be executed following the conditional branch instruction and/or instructions included in an instruction sequence to be executed after the branching to the executing units while whether or not to branch is not determined, a branching determining device for determining whether to branch when the another instruction is executed, and an execution result managing device for identifying whether the execution results of the instruction sequences are effective based on the determining results of the branching determining device.

28 Claims, 23 Drawing Sheets

Fig. 5

|  | (A) | (B) | (C) |
|---|---|---|---|
| Proceding Instruction Sequence (A) | Check Data-Dependence | Check Data-Dependence | Check Data-Dependence |
| Succeeding Instruction Sequence (B) | | Check Data-Dependence | Do Not Check Data-Dependence |
| Post-Branching Instruction Sequence (C) | | | Check Data-Dependence |

Fig. 7

| | |
|---|---|
| N+2(FPU) | 00 |
| N+1(FPU) | 00 |
| N(INT) | 00 |
| N-1(INT) | 00 |
| N-2(INT)<br>(PSR Updating Inst.) | 00 |
| N-3(LD) | 00 |

↑ Storing Order

Data-Dependence

Fig. 8

| Processing Unit 8 | Processing Unit 9 | Processing Unit 10 | Processing Unit 11 |
|---|---|---|---|
| N-3 | N-1 | N | N+1 |
| N-3 | N+3 | M | N+2 |
|  | N-2 | N+4 | M+1 |
|  | N+5 | M+2 |  |
|  | M+3 | M+4 |  |

Fig. 9

| | |
|---|---|
| N+4(INT) | 01 |
| M(INT) | 10 |
| N+3(INT) | 01 |
| Bcc·i | 00 |
| N+2(FPU) | 00 |
| N-2(INT)<br>(PSR Updating Inst.) | 00 |

↑ Storing Order

Fig. 10

| Mode | Register No. | Processing Result |
|---|---|---|
| 01 | Register No. to Which the processing result of Inst. (N+3) is written to. | Processing result of Inst. (N+3) |
| 10 | Register No. to Which the processing result of Inst. (M) is written to. | Processing result of Inst. (M) |
| 01 | Register No. to Which the processing result of Inst. (N+4) is written to. | Processing result of Inst. (N+4) |
| 10 | Register No. to Which the processing result of Inst. (M+1) is written to. | Processing result of Inst. (M+1) |
| 01 | Register No. to Which the processing result of Inst. (N+5) is written to. | Processing result of Inst. (N+5) |
| 10 | Register No. to Which the processing result of Inst. (M+2) is written to. | Processing result of Inst. (M+2) |
|  |  |  |

Fig. 11

| | |
|---|---|
| N+6(INT) | 01 |
| M+2(INT) | 10 |
| N+5(INT) | 01 |
| M+1(FPU) | 10 |
| N+4(INT) | 01 |
| N-2(INT)<br>(PSR Updating Inst.) | 00 |

↑ Storing Order

Fig. 13

| Bcc·1 | 01 |
|---|---|
| N+8(FPU) | 01 |
| N+7 (PSR Updating Inst.) | 01 |
| N+6(INT) | 01 |
| N+5(INT) | 01 |
| N+4(LD) | 01 |

↑ Storing Order

Data-Dependence (from N+7 to N+4)

Fig.14

| Processing Unit 8 | Processing Unit 9 | Processing Unit 10 | Processing Unit 11 |
|---|---|---|---|
| N+4 | N+5 | N+6 | N+8 |
| N+4 | N | N+1 | N+3 |
|  | N+7 | N+2 |  |
| N+4 | N+5 | N+6 | N+8 |
| N+4 | N | N+1 | N+3 |

Fig. 15

| | |
|---|---|
| N+3(FPU) | 11 |
| N+2(INT) | 11 |
| N+1(INT) | 11 |
| N(INT) | 11 |
| Bcc·1 | 01 |
| N+7<br>(PSR Updating Inst.) | 01 |

↑ Storing Order

Fig. 16

| Mode | Register No. | Processing Result |
|---|---|---|
| 11 | Register No. to Which the processing result of Inst. (N) is written to. | Processing result of Inst. (N) |
| 11 | Register No. to Which the processing result of Inst.(N+1) is written to. | Processing result of Inst. (N+1) |
| 11 | Register No. to Which the processing result of Inst.(N+3) is written to. | Processing result of Inst. (N+3) |
| 11 | Register No. to Which the processing result of Inst. (N+2) is written to. | Processing result of Inst.(N+2) |
| | | |
| | | |

Fig. 17

| | |
|---|---|
| N+7<br>(PSR Updating Inst.) | 11 |
| N+6(INT) | 11 |
| N+5(INT) | 11 |
| N+4(LD) | 11 |
| N+2(INT) | 11 |
| N+7<br>(PSR Updating Inst.) | 01 |

Data-Dependence

Storing Order

Fig. 20

| Processing Unit 8 | Processing Unit 9 | Processing Unit 10 | Processing Unit 11 |
|---|---|---|---|
| N+4 | N+5 | N+6 | N+8 |
| N+4 | N+9 | N+10 | N+11 |
| N+13 | N+7 | N+12 | |
| N+13 | N+14 | N+15 | |
| | N+16 | N+17 | |

Fig. 21

| | |
|---|---|
| N+12(INT) | 10 |
| N+11(FPU) | 10 |
| N+10(INT) | 10 |
| N+9(INT) | 10 |
| Bcc·n | 01 |
| N+7(INT)<br>(PSR Updating Inst.) | 01 |

↑ Storing Order

Fig. 23

| | |
|---|---|
| N+16(INT) | 10 |
| N+15(INT) | 10 |
| N+14(INT) | 10 |
| N+13(LD) | 10 |
| N+12(INT) | 10 |
| N+7(INT)<br>(PSR Updating Inst.) | 01 |

↑ Storing Order

SPECULATIVE EXECUTION PROCESSOR

BACKGROUND OF THE INVENTION (1) Field of the Invention

The present invention relates to a processor including a plurality of parallel executing units, and particularly, to a high-speed processing of conditional branch instructions thereof.

(2) Description of the Related Art

Recent efforts of computer researchers in increasing a processing speed culminated in the building of sophisticated processors that employ a plurality of executing units known as Superscalar or VLIW(Very Long Instruction Word). These processors enable parallel processing of several instructions which used to be processed in sequential. A well known commercialized example is a Motorola Inc.'s MC88100, details of which are in "MC88100 MICROPROCESSOR USER'S MANUAL SECOND EDITION", Motorola, Inc.

Another type of sophisticated processors that employ a high-speed processing method called the out-of-order execution also attracts public interest, in which executable instructions free of data-dependence are processed regardless of instruction order Further information is in "An Extended Superscalar Processor Prototype Based on the SIMP(Simple Instruction Stream/Multiple Instruction Pipelining) Architecture", Interdisciplinary Graduate School of Engineering Sciences, Kyushu University, Shingaku Giho, CPSY-90-6.54, July 1990.

However, parallel processing by these processors causes more frequent occurrence of conditional branch instructions per cycle than the sequential processing. Given that the processors will not determine whether to branch or not to branch until the conditions thereof have been decided or a PSR(Program Status Register) has been updated, they cause an interlock in each instruction flow due to so-called control-dependence, offsetting the advantages of parallel processing.

In order to overcome this, these sophisticated processors exploit a speculative execution: they predict whether they will determine to branch or not to branch before its condition is decided, for example, by following the result of the preceding conditional branch instruction, and execute the predicted instruction in advance.

However, when the prediction turns out wrong, it is necessary to return to the branch point and execute alternate instructions from the start, resulting in a great time loss. Given these circumstances, it can be said that these conventional processors do not necessarily increase the processing speed for a program.

SUMMARY OF THE INVENTION

The present invention has an object to provide a processor that enables a high-speed processing by executing instructions before the condition of the conditional branch instruction is decided, while minimizing the occurrence of the interlocks in the instruction flows.

The above object is fulfilled by a processor including a plurality of executing units for processing in parallel a plurality of instructions in an instruction sequence stored in its memory. The processor comprises an instruction type distinguishing device for distinguishing a type of a conditional branch instruction included in the unexecuted instruction sequence, the condition of the conditional branch instruction depending on another instruction, an instruction parallel-issuing device for issuing in parallel instructions included in a succeeding instruction sequence to be executed following the conditional branch instruction and/or instructions included in an instruction sequence to be executed after the branching to the executing units while whether or not to branch is not determined, a branching determining device for determining whether to branch when another instruction is executed, and an execution result managing device for identifying whether the execution results of the instruction sequences are valid based on the determining results of the branching determining device.

The instruction type distinguishing device may distinguish a first type of instructions from the others, of which possibilities for branching and non-branching are substantially equal from the others, the instruction parallel-issuing device issues instructions included in both the succeeding instruction sequence to be executed following the conditional branch instruction and in the instruction sequence to be executed after the branching to the executing units in parallel when the conditional branch instruction is one of the first type of instructions while it issues instructions included in either of the succeeding instruction sequence to be executed following the conditional branch instruction or the instruction sequence to be executed after the branching to the executing units in parallel when the conditional branch instruction is not one of the first type of instructions. The execution results managing device makes the execution result of the instructions included in either succeeding instruction sequence to be executed following the conditional branch instruction or the instruction sequence to be executed after the branching valid and the other result invalid based on the determining result of the branching determining device when the conditional branch instruction is one of the first type of instructions. While the execution result managing device selectively makes the execution results of instructions included in the succeeding instruction sequence to be executed following the conditional branch instruction and the instruction sequence to be executed after the branching valid or invalid based on the result of the branching determining device when the conditional branch instruction is not one of the first type of instructions.

The instruction type distinguishing device may further distinguish a second type of instruction that has a good possibility for branching compared with the first type of instructions and a third type of instructions that has a good possibility for non-branching compared with the first type of instructions besides the first type of instructions, and the instruction parallel-issuing device issues instructions included in the instruction sequence to be executed after the branching into the executing units in parallel when the conditional branch instruction is one of the second type of instructions, while it issues instructions included in the succeeding instruction sequence to be executed following the conditional branch instruction to the executing units in parallel when the conditional branch instruction is one of the third type of instructions.

The processor may further comprise a first instruction fetch buffer for storing temporarily the succeeding instruction sequence to be executed following the conditional branch instruction, a second instruction fetch buffer for storing temporarily the instruction sequence to be executed after the branching, and an instruction fetching device for fetching instructions stored in the memory and selectively writes them into the first instruction fetch buffer and the second instruction fetch buffer.

The instruction fetch device may include a program counter for outputting read-out addresses to the memory while incrementing its address, a conditional branch instruction detecting device for detecting a conditional branch instruction among the instructions fetched from the memory, a calculating device for calculating a branch address based on the conditional branch instruction detected by the conditional branch instruction detecting device, and a fetch controlling device for writing the instructions into the first instruction fetch buffer while incrementing its address every time an instruction is fetched from the memory, and for writing instructions included in the succeeding instruction sequence to be executed following the conditional branch instruction into the first instruction fetch buffer and instructions included in the instruction sequence to be executed after the branching into the second instruction fetch buffer by writing the branch address calculated by the calculating device into the program counter when the conditional branch instruction is detected.

The instruction parallel-issuing device may include a plurality of decoding devices for decoding the instructions and thence generating control signals outputted to the executing units, a transfer controlling device for transferring the instructions in the first instruction fetch buffer and the second instruction fetch buffer to the plurality of decoding device one for each, a mode adding device for adding a mode to each instruction transferred from the transfer controlling device, which indicates that which instruction sequence the instruction belongs to by adding one mode to the succeeding instruction sequence to be executed following the conditional branch instruction and another mode to the instruction sequence to be executed after the branching.

Each mode added by the mode adding device may be data in the form of 2-bit, the mode adding device adds a first value to the current mode of the conditional branch instruction for the succeeding instruction sequence to be executed following the conditional branch instruction, while it adds a second value to the current mode of the conditional branch instruction for the instruction sequence to be executed after the branching.

Another instruction on which the conditional branch instruction depends may be an instruction that updates a PSR, and the branching determining device may detect the execution of the instruction that updates the PSR and refer to the execution result.

The processor may further comprise a data-dependence detecting device for detecting data-dependence among a plurality of the decoded instructions by referring to a plurality of decoding results of the decoding device, a scoreboard managing device for managing which registers are in operation for the instructions being executed by the executing units, an availability detecting device for detecting the availability of the executing units, and an instruction issuance allowing device for allowing the instruction parallel-issuing device to issue instructions identified with the issuable ones based on the detecting result of the data-dependence detecting device, the status of the scoreboard managing device, and the detecting result of the availability detecting device into the executing units, while allowing the instruction parallel-issuing device to issue the conditional branch instruction to the branching determining device.

The instruction issuance allowing device may identify instructions with issuable ones by confirming that the decoding results of the plurality of the decoding device have no data-dependence among each other from the detecting result of the data-dependence detecting device, that the registers designated by the operand of the decoding results are not being in operation for the instructions being executed by the executing units from the data in the scoreboard managing device, and that the executing units for the instructions are available from the detecting result of the availability detecting device.

The processor may further comprise an execution unit managing table for holding data for each executing unit as to whether they are executing the instructions, the data being referred by the availability detecting device, and a scoreboard for holding data as to which registers are in operation for the instructions being executed by the executing units, the data being referred by the scoreboard managing device.

The execution result managing device may include an initial mode holding device for holding the mode of the conditional branch instruction issued by the instruction parallel-issuing device as an initial mode, a speculative execution type holding device for holding the type of the conditional branch instruction issued by the instruction parallel-issuing device, and a speculative execution status indicating device for indicating that the condition of the conditional branch instruction issued by the instruction parallel-issuing device has not been decided by means of a flag, wherein the instruction parallel-issuing device issues the conditional branch instruction to the branching determining device, while at the same time it sets the mode thereof in the initial mode holding device, the type thereof in the speculative execution type holding device, and the flag in the speculative status indicating device.

The execution result managing device may include a temporarily storing device storing a set of the execution results of the executing units, the modes of the instructions, and data as to where these execution results are to be stored.

The temporarily storing device may store the register numbers of the execution results when they are to be stored into the registers, and stores the memory addresses thereof when they are to be stored in the memory.

The branching determining device may reset the flag in the speculative execution status indicating device upon its determination, and the execution result managing device identifies whether the execution results in the temporarily storing device are effective ones by referring to the initial mode holding device based on the detecting result of the branching determining device and speculative execution type holding device, thence transfers only the effective execution results into where they are to be stored while clearing the other invalid execution results.

According to the above construction, the processor of the present invention selects which instructions are to be speculatively executed in accordance with the types of the conditional branch instructions before the conditions thereof are decided, thus making it possible to minimize the interlocks in the instruction flows, hence increasing the processing speed of the program including the branch processing. In particular, such an effect can be obviously witnessed when a plurality of instructions are executed in parallel, because it efficiently minimizes a time lag between the conditional branch instructions and instructions that update the conditions thereof.

More precisely, the processor makes it possible to increase the processing speed by executing in advance instructions selected according to a type of the conditional branch instructions. In the present invention, they are divided into the first type, the second type and the third type based on their possibilities for branching and non-branching:

(1) When the conditional branch instruction is one of the first type, it speculatively issues only the instructions included in the instruction sequence to be executed after the branching to the executing units in parallel, and stores the execution results thereof temporarily until the condition thereof is decided, while it executes instructions included in the succeeding instruction sequence to be executed following the conditional branch instruction when the processor has determined not to branch. The conditional branch instructions of the first type have a good possibility for branching.

(2) When the conditional branch instruction is one of the second type, it speculatively issues both the instructions included in the instruction sequence to be executed after the branching and ones included in the succeeding sequence to be executed following the conditional branch instruction to the executing units in parallel, and stores the execution results thereof temporarily, thence uses only the execution results of effective instructions when the condition thereof have been decided. The instructions of the second type have substantially equal possibilities for branching and for non-branching.

(3) When the conditional branch instruction is one of the third type, it speculatively issues only the instructions included in the succeeding instruction sequence to be executed following the conditional branch instruction into the executing units in parallel, and stores the execution results temporarily until the condition thereof is decided, while it executes instructions included in the instruction sequence to be executed after the branching when it has determined to branch. The instructions of the third type have a good possibility for non-branching.

BRIEF DESCRIPTION OF THE DRAWINGS

These and other objects, advantages and features of the invention will become apparent from the following description thereof taken in conjunction with the accompanying drawings which illustrates a specific embodiment of the invention. In the drawings:

FIG. 5 is a view explaining how to check data dependence among the instruction sequences;

FIG. 7 is the first illustration explaining how instructions are stored in the instruction decoding buffer 6 during the speculative execution for the Bcc_i instruction;

FIG. 8 is a view showing which executing units 8–11 are executing which instructions during the speculative execution for the Bcc_i instruction;

FIG. 9 is the second illustration explaining how instructions are stored in the instruction decoding buffer 6 during the speculative execution for the Bcc_i instruction;

FIG. 10 is a view how the execution results are stored in the execution order management buffer 13 during the speculative execution for the Bcc_i instruction;

FIG. 11 is the third illustration explaining how instructions are stored in the instruction decoding buffer 6 during the speculative execution for the Bcc_i instruction;

FIG. 13 is the first illustration explaining how instructions are stored in the instruction decoding buffer 6 during the speculative execution for the Bcc_1 instruction;

FIG. 14 is a view showing which executing units 8–11 are executing which instructions during the speculative execution for the Bcc_1 instruction;

FIG. 15 is the second illustration explaining how instructions are stored in the instruction decoding buffer 6 during the speculative execution for the Bcc_1 instruction;

FIG. 16 is a view how the execution results are stored in the execution order management buffer 13 during the speculative execution for the Bcc_1 instruction;

FIG. 17 is the third illustration explaining how instructions are stored in the instruction decoding buffer 6 during the speculative execution for the Bcc_1 instruction;

FIG. 20 is a view showing which executing units 8–11 are executing which instructions during the speculative execution for the Bcc_n instruction;

FIG. 21 is the second illustration explaining how instructions are stored in the instruction decoding buffer 6 during the speculative execution for the Bcc_n instruction;

FIG. 23 is the third illustration explaining how instructions are stored in the instruction decoding buffer 6 during the speculative execution for the Bcc_n instruction.

DESCRIPTION OF THE PREFERRED EMBODIMENT

The construction and operation of the processor of the present invention is explained hereunder with referring to drawings. The processor is designed so that it speculatively executes instructions when it detects a conditional branch instruction which is referred to simply as a branch instruction hereinafter. In general, the branch instructions are divided into two groups in the programming language C: a loop group that maintains a good possibility for branching, and an if-then-else group that maintains substantially equal possibilities for branching and non-branching. In this embodiment, these two groups are further divided into three types of Branch with Condition Code Instructions (Bcc) in the form of the machine instruction as below, and referred to as such hereinafter.

(1) Bcc_i Instruction : an if-then-else branch instruction of which possibilities for branching and non-branching are substantially equal. (Switch statements are generally regraded to be a Bcc-i instruction.)

(2) Bcc_1 Instruction : a loop branch instruction that maintains a good possibility for branching compared with Bcc_i Instruction.

(3) Bcc_n Instruction: a branch instruction that maintains a good possibility for non-branching compared with Bcc_i Instruction.

Figure 1:
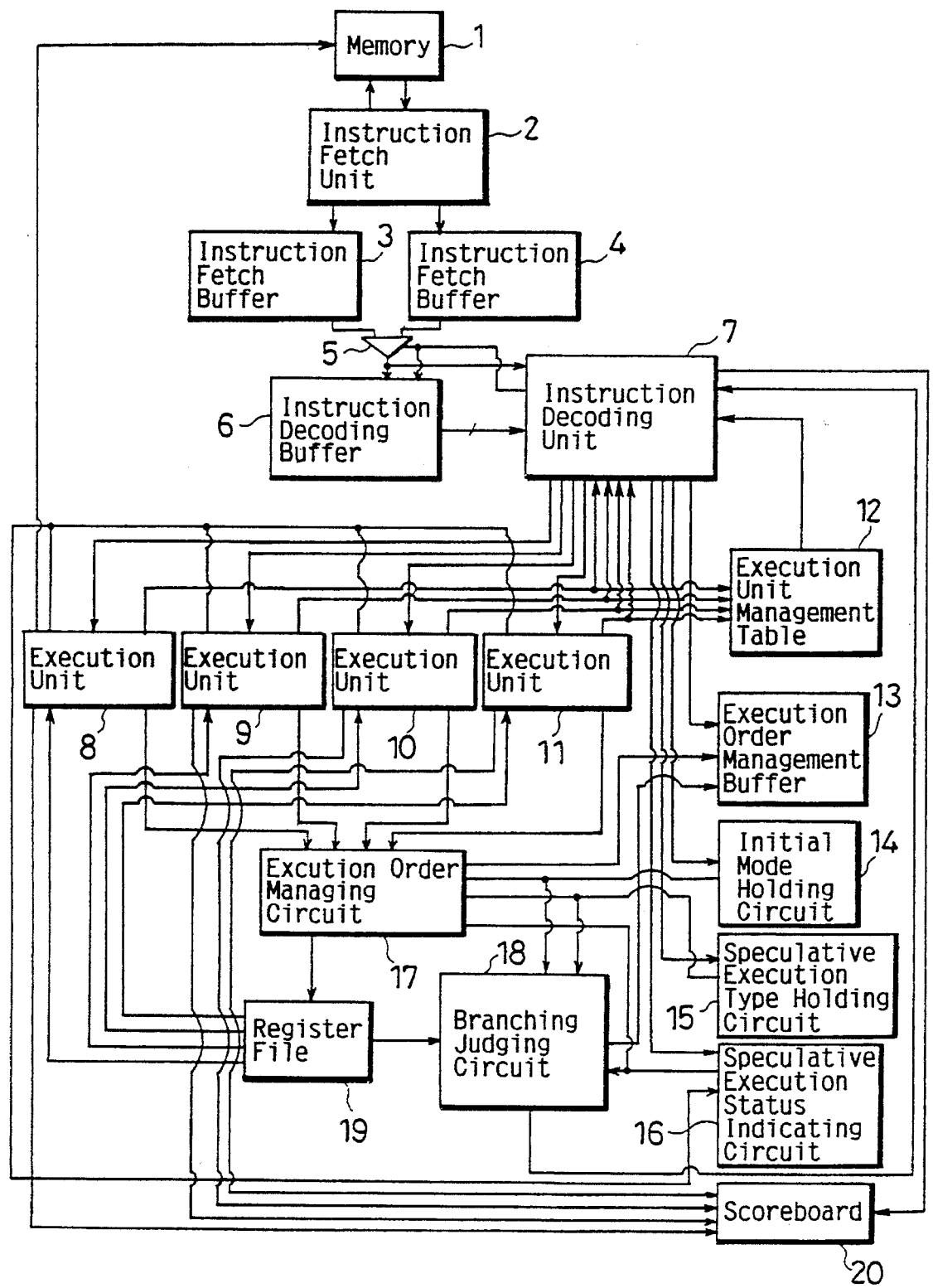
FIG. 1 is a block diagram of the processor of the present invention.

As is shown in FIG. 1, the processor of the present invention is composed of a memory 1, an instruction fetch unit 2, instruction fetch buffers 3 and 4, a selector 5, an instruction decoding buffer 6, an instruction decoding unit 7, executing units 8–11, an executing unit management table 12, an execution order management buffer 13, an initial mode holding circuit 14, a speculative execution type holding circuit 15, a speculative execution status indicating circuit 16, and an execution order management circuit 17, a branch judging circuit 18, a register file 19, and a scoreboard 20.

The memory 1 stores instruction sequences and operand data that constitute a program.

The instruction fetch unit 2 prefetches instructions from the memory 1 while detecting the branch instruction among these prefetched ones, and selectively writes them into the instruction fetch buffers 3 and 4 based on the detecting result: when it detects the branch instruction, it prefetches instructions included in a succeeding instruction sequence and ones included in a post-branching instruction sequence, and writes the former into one of the instruction fetch buffers 3 and 4 that has been storing the preceding instruction sequence, and the latter into the other; the former consists of the instructions to be executed when the processor has determined not to branch, and the latter consists of the ones to be executed when the processor has determined to branch. It prefetches instructions asynchronously with instruction decoding or execution, so that it steadily writes them into the instruction fetch buffers 3 and 4 to their full.

The instruction fetch buffers 3 and 4 are same in the capacity, and send the prefetched instructions to the instruction fetch buffer 6 using FIFO(First-In-First-Out) memories.

The selector 5 switches from the instruction fetch buffer 3 to the instruction fetch buffer 4 and vice versa under the control of the instruction decoding unit 7.

The instruction decoding buffer 6 stores the instructions to be decoded. It has a capacity of six instructions herein. However, it is preferable for the instruction decoding buffer 6 to have a capacity of as many instructions as the executing units.

The instruction decoding unit 7 controls the instruction fetch buffers 3 and 4 to transfer the instructions to the instruction decoding buffer 6, as well, it decodes thence issues these instructions to the executing units 8–11.

The executing unit 8 executes load instructions and store instructions; the executing units 9 and 10 executes integer instructions; and the executing units 11 executes floating point instructions. For explanation's convenience, the load instruction takes two cycles, and other instructions take one cycle herein. The number of unit pipeline stages is not defined, as it is not the gist of the present invention.

The executing unit management table 12 stores data concerning availability of the executing units 8–11 in the form of a bit per executing unit. These bits are set at the initiation of the execution and cleared at the termination by the respective executing units 8–11.

The execution order management buffer 13 stores the results of the speculative execution accompanied with their register numbers and modes. For this reason, it consists of a mode field, a register number field, and a storing field as shown in FIG. 10.

The initial mode holding circuits 14 holds the mode added to the branch instruction by the instruction decoding unit 7 as an initial mode.

The speculative execution type holding circuit 15 holds data as to which type of the branch instruction is being executed.

The speculative execution status indicating circuit 16 holds a flag indicating that the speculative execution is being proceeded.

The execution order management circuit 17 selectively writes the execution results of the instructions from the executing units 8–11 to the register file 19 and execution order management buffer 13 based on the data in the initial mode holding circuits 14, speculative execution type holding circuit 15, and speculative execution status indicating circuit 16: when an instruction is not under the speculative execution, it writes the execution result directly into the register file 19; when an instruction is under the speculative execution, it writes the execution result into the execution order management buffer 13 with the mode and register number thereof, so that it transfers the execution result to the register file 19 efficiently when the speculative execution has been completed.

The branch judging circuit 18 decides whether or not to branch based on an updated PSR, thence selectively sends an execution instruction to the instruction decoding unit 7, a data clearing instruction to the execution order management buffer 13, and a data transferring instruction to the execution order managing circuit 17:

(1) During the speculative execution for the Bcc__l instruction, only the post-branching instructions are speculatively executed. Therefore, when the processor has determined not to branch, it clears all the results of the speculative execution in the execution order management buffer 13, while at the same time it sends an instruction to execute the succeeding instructions to the instruction decoding unit 7.

(2) During the speculative execution for the Bcc__i instruction, the post-branching instructions and succeeding instructions are speculatively executed; it thus clears the results of the invalid speculative executions.

(3) During the speculative execution for the Bcc__n instruction, only the succeeding instructions are speculatively executed. Therefore, when the processor has determined to branch, it clears all the results of the speculative execution in the execution order management buffer 13, while at the same time it sends an instruction to execute the post-branching instructions to the instruction decoding unit 7.

The register file 19 includes 32 registers and stores the execution results of the instructions.

The scoreboard 20 includes 32 flags of 2-bit, one for each register in the register file 19: a 1-bit indicates the speculative execution, while the other 1-bit does the non-speculative execution.

Figure 2:
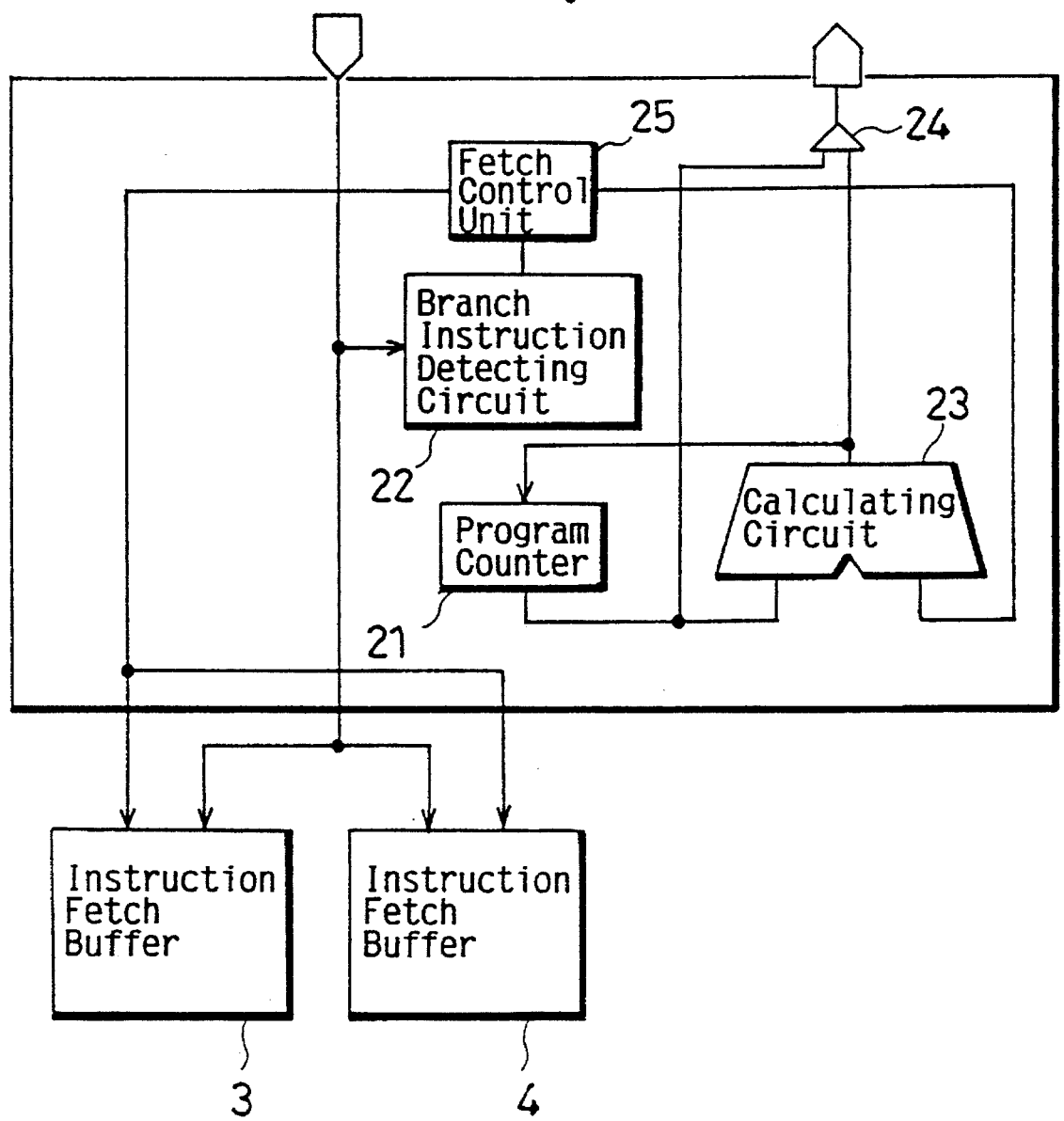
FIG. 2 is a block diagram of the instruction fetch unit 2 in FIG. 1.

As is shown in FIG. 2, the instruction fetch unit 2 is composed of a program counter 21, a branch instruction detecting circuit 22, a calculating circuit 23, a selector 24, and a fetch controlling unit 25.

The program counter 21 outputs addresses of the instructions to be prefetched from the memory 1, and increments its address every time an instruction is pre-retched.

The branch instruction detecting circuit 22 detects the branch instruction among the prefetched instructions from the memory 1.

The calculation circuit 23 calculates a branch address based on the detected branch instruction.

The selector 24 selectively sends the outputs from the program counter 21 and calculation circuit 23 to the memory 1.

The fetch controlling unit 25 controls the instruction prefetch from the memory 1, and instruction writing to the instruction fetch buffers 3 or 4: it controls the program counter 21 to output the addresses steadily to the memory 1 while incrementing the address thereof, and to write the prefetched instructions to either the instruction fetch buffers 3 or 4 until the branch instruction detecting circuit 22 detects the branch instruction; upon the detection, it controls the calculating circuit 23 to output the branch address by inputting data concerning the branch address so as to prefetch the post-branching instructions as well, and writes them into the other instruction fetch buffer.

Figure 3:
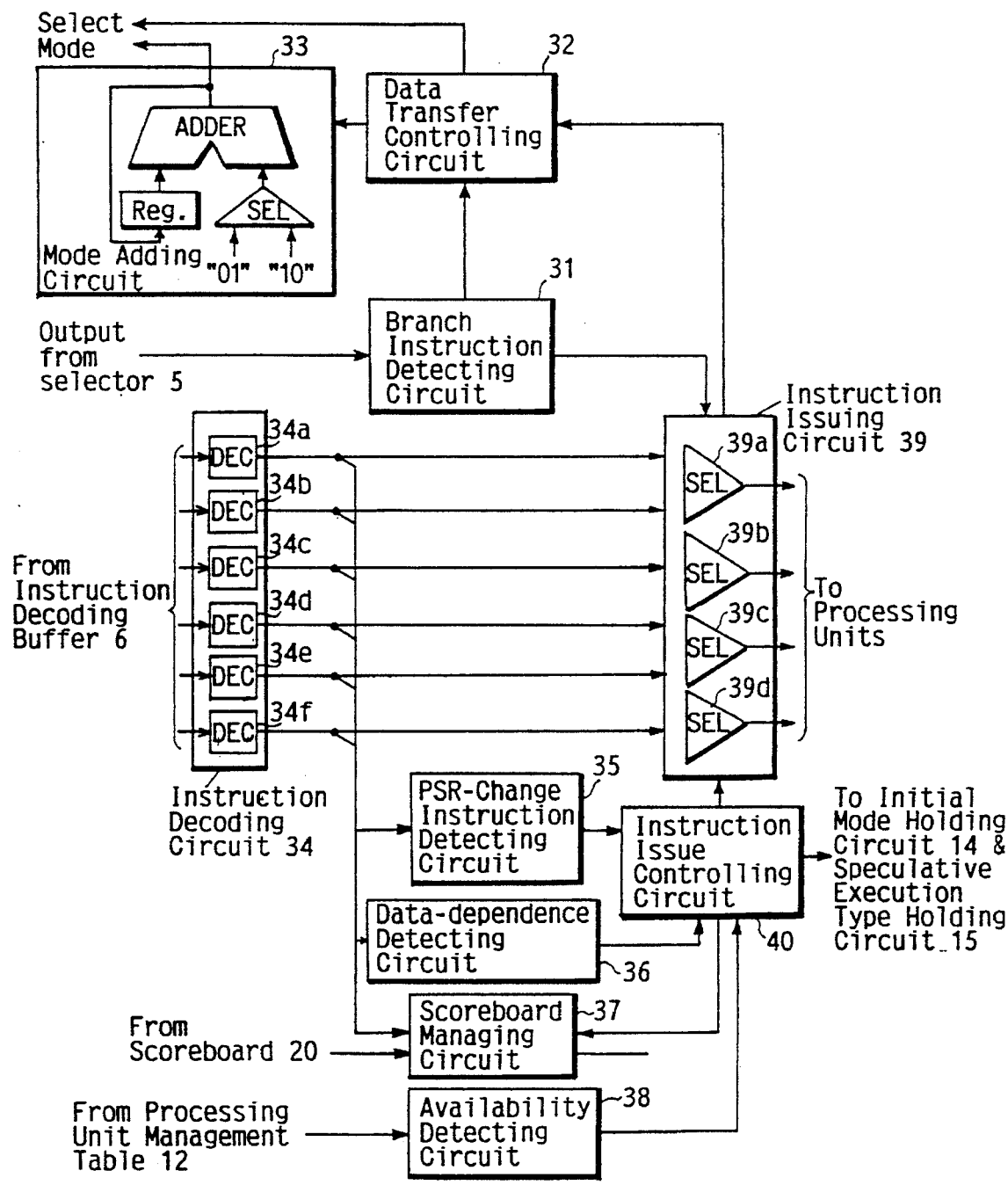
FIG. 3 is a block diagram of the instruction decoding unit 7 in FIG. 1.

As is shown in FIG. 3, the instruction decoding unit 7 is composed of a branch instruction detecting circuit 31, a data transfer controlling circuit 32, a mode adding circuit 33, an instruction decoding circuit 34, a PSR-change instruction detecting circuit 35, a data-dependence detecting circuit 36, a scoreboard managing circuit 37, an availability detecting circuit 38, an instruction issuing circuit 39, and an instruction issue controlling circuit 40.

The branch instruction detecting circuit 31 detects the branch instruction among the outputs from the selector 5.

The data transfer controlling circuit 32 selectively transfers the instructions from the instruction fetch buffers 3 and 4 by means of the selector 5 to the instruction decoding buffer 6 based on the detecting result of the branch instruction detecting circuit 31:

(1) When the branch instruction detecting circuit 31 does not detect the branch instruction, it detects which one of the instruction fetch buffers 3 and 4 has been storing the instructions, thence transfers the instructions therefrom to the instruction decoding buffer 6 by means of the selector 5.

(2) When the branch instruction detecting circuit 31 detects the Bcc_1 instruction, it switches the selector 5 to the other instruction fetch buffer so that only the post-branching instructions are transferred to the fetch buffer 6.

(3) When the branch instruction detecting circuit 31 detect the Bcc_i instruction, it switches the selector 5 from the instruction fetch buffer 3 to the instruction fetch buffer 4 in turn, so that the succeeding and post-branching instructions are alternately stored in the instruction decoding buffer 6.

(4) When the branch instruction detecting circuit 31 detects the Bcc_n instruction, it continues to transfer the succeeding instructions to the fetch buffer 6, so that only the succeeding instructions are stored therein.

The mode adding circuit 33 adds a mode to each instruction from the data transfer controlling circuit 32 in accordance with the following rule.

(1) Add a code "01" to its current mode for the succeeding instruction sequence.

(2) Add a code "10" to its current mode for the post-branching instruction sequence.

Figure 4:
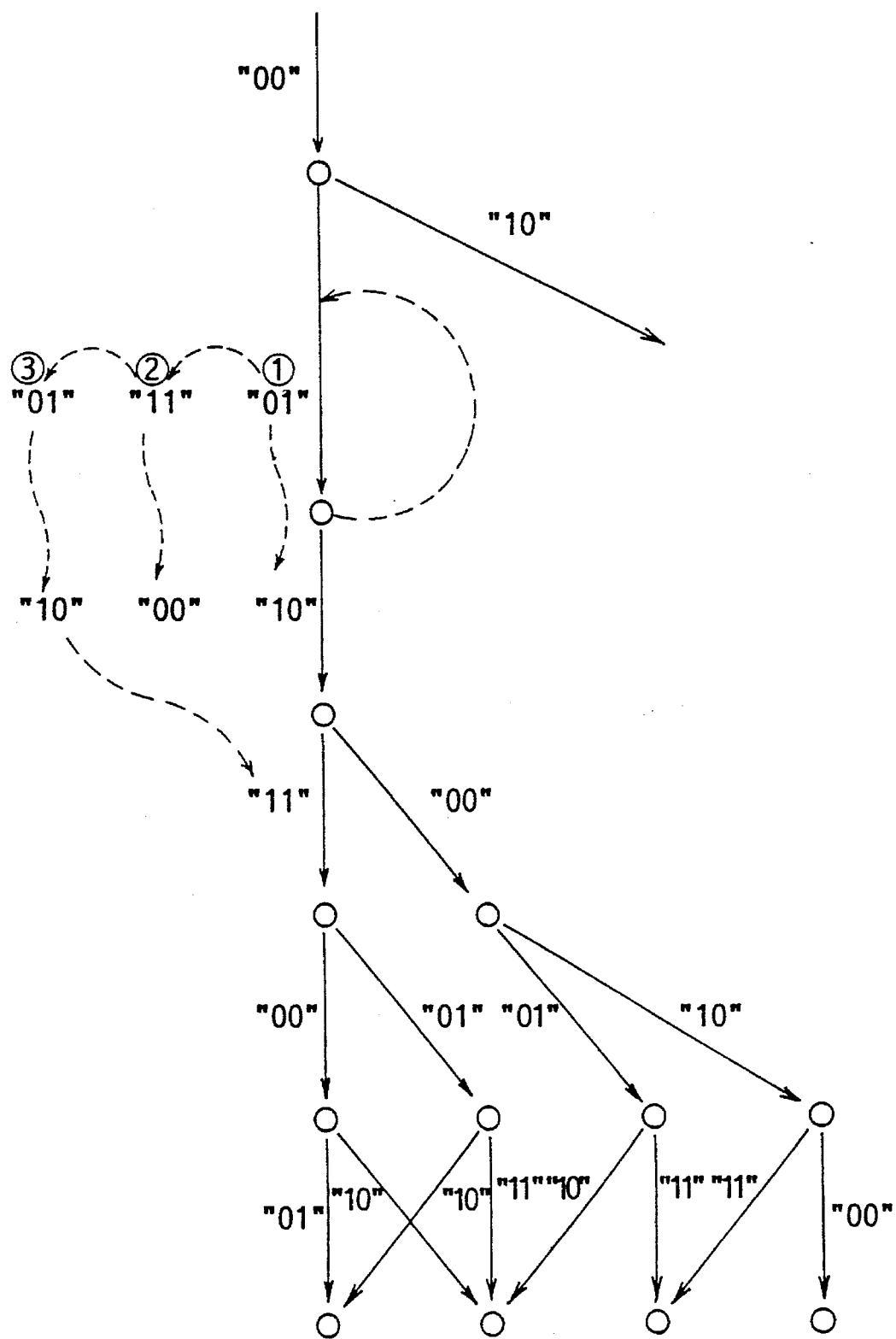
FIG. 4 is a view depicting an instruction flow with the respective modes.

The flow of the instructions with their modes are shown in FIG. 4, wherein a mark ↓ denotes an instruction sequence, a mark ○ denotes the branch instruction, a mark ̧denotes a point where a loop returns to, and 1̂–3̂ denote how many times the loop iterates.

Assuming that the instruction sequence currently maintains a mode "00", the succeeding instruction sequence maintains a mode "01" as the code "01" is added to the current mode "00", while the post-branching instruction sequence maintains a mode "10" as the code "10" is added to the current mode "00". This mode rule facilitates to sort out the preceding, succeeding, and post-branching instruction sequences. As well, it enables a trace of the instruction sequence even when the branch instruction repeatedly occurs.

The instruction decoding circuit 34 includes six decoders 34a–34f so that it decodes 6 instructions in parallel. It is desirable for the instruction decoding circuit 34 to have as many decoders as the executing units and as stages in the instruction decoding buffer 6.

The PSR-change instruction detecting circuit 35 detects whether these instructions update the PSR, and notifies the detecting result to the branch judging circuit 18 as the condition is decided based on the updated PSR.

The data-dependance detecting circuit 36 detects data-dependance among these six decoded instructions by comparing their register fields each other; it detects data-dependence when the destination register of the preceding instruction is the source register of the succeeding one. Data-dependance among the six instructions stored in the instruction decoding buffer 6 and ones that have not been stored therein is not subject to such detection as they are never executed simultaneously. Hence, only the six instructions stored in the instruction decoding buffer 6 are subject to the detection; however, as shown in FIG. 4, data-dependence between the one of post-branching instruction sequence (B) and the one of succeeding instruction sequence (C) are not subject to such detection due to their exclusivity.

The scoreboard managing circuit 37 checks which registers are in operation by referring to the scoreboard 20, and set the flags in the scoreboard 20 based on the decoding of the decoders 34a–34f when any of these instructions changes the registers.

The availability detecting circuit 38 detects which executing units 8–11 are available by referring to the executing unit management table 12.

The instruction issuing circuit 39 includes four selectors 39a–39d, and it issues instructions forwarded from the instruction issue controlling circuit 40 to the executing units 8–11 in parallel after adding an identifier to each instruction: an identifier "1" for the speculative execution, and an identifier "0" for the non-speculative one.

The instruction issue controlling circuit 40 controls the instruction issuing circuit 39. It detects issuable instructions among the decoded instructions by checking whether they have no data-dependence on each other(data-dependence detecting circuit 36), whether their registers are not being used(the scoreboard managing circuit 37); and whether the executing units for the instructions are available at the moment(the availability detecting circuit 38). Only when they satisfy all of these conditions, it forwards them to the instruction issuing circuit 39. Upon the issuance, it clears them from the instruction decoding buffer 6.

When the issuable instruction is the branch instruction, it does not issue the branch instruction to the executing units 8–11. Instead, it sets the mode thereof in the initial mode holding circuit 14, the type thereof in the speculative execution type holding circuit 15, the flag indicating that the speculation execution is proceeding in the speculation execution status indicating circuit 16, and the condition thereof in the branch judging circuit 18. Henceforward, the processor commences the speculative execution status.

For further explanation, each flow of the Bcc_i, Bcc_1, and Bcc_n instructions is explained hereunder separately.
(Bcc_i Instruction)

Figure 6:
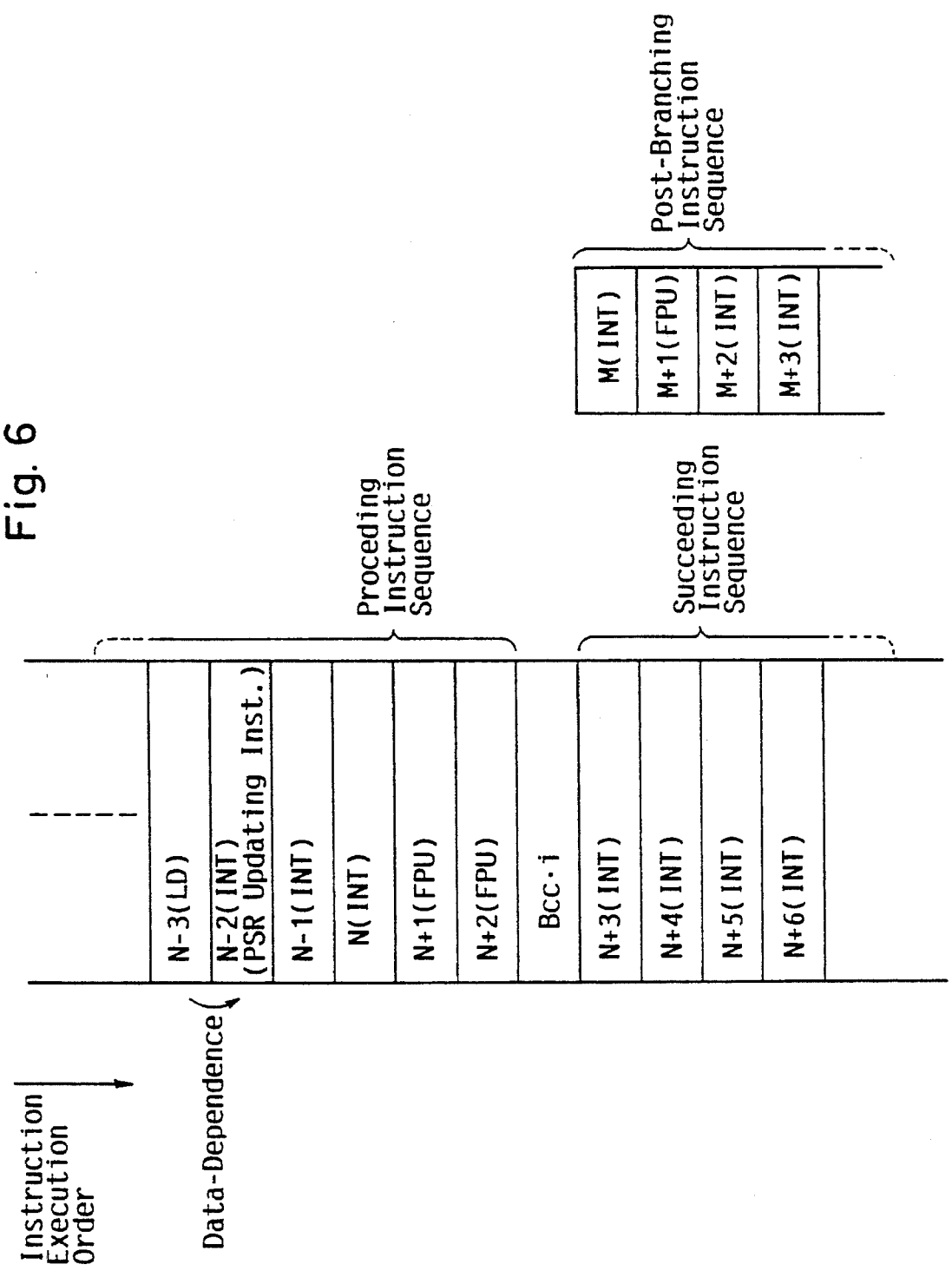
FIG. 6 is the $Bcc_{13}$ i instruction flow.

In FIG. 6, a instruction flow of the Bcc_i instruction is illustrated, wherein a mark ↓ denotes the time sequence, a mark ̧denotes data-dependence, and capital letters LD, INT, and FPU in brackets stand for a load instruction, an integer instruction, and a floating point instruction, respectively.

As previously explained, the instruction fetch unit 2 prefetches instructions steadily from the memory 1 using the program counter 21, and stores them into the instruction fetch buffer 3 until the branch instruction detecting circuit 22 detects the branch instruction among these instructions. Upon the detection, the calculation circuit 23 calculates the branch address thereof, thence the instruction fetch unit 2 prefetches the post-branching instructions in addition to the succeeding instructions and writes the former into the instruction fetch buffer 4 and the latter to the instruction fetch buffer 3 to their capacity.

Instructions N–3 to N+2 constitute the instruction sequence preceding to the branch instruction, namely Instruction Bcc_i, Instructions M to M+3 do the post-branching instruction sequence, and Instructions N+3 to N+6 do the instruction sequence succeeding to the branch instruction. The instruction sequence preceding to Instruction N–3 is not explained herein as it is irrelevant here.

Assuming that the instruction fetch buffer 3 stores the succeeding instruction sequence while the instruction fetch buffer 4 does the post-branching instruction sequence, the speculative execution for the Bcc_i instruction is proceeded with the following steps.

(1) The instruction decoding unit 7 reads out Instructions N–3 to N+2 from the instruction fetch buffer 3, and adds the mode "00" thereto, thence sends them to the instruction decoding buffer 6, which stores these Instructions as is shown in FIG. 7.

(2) The data-dependence detecting circuit 36 detects the data-dependence among the Instructions N–3 to N+2, while the scoreboard managing circuit 37 checks which registers are in operation, the availability detecting circuit 38 detects which executing units are available by referring to the executing unit management table 12, and based on which the instruction issue controlling circuit 40 identifies Instructions N–3, N–1, N, and N+1 with issuable ones, and forwards them to the instruction issuing circuit 39 for issuing, while clearing these four Instructions from the instruction decoding buffer 6 upon the issuance together with the identifiers. Being the instruction under the nonspeculative execution, their identifiers are "0". Instruction N–2 is not issued until Instruction N–3 has been completed due to data-dependence. The executing units 8–11 sets the respective corresponding bits in the executing unit management table 12 once they receive these Instructions. The first row of the table in FIG. 8 shows which executing units 8–11 are executing which Instructions.

(3) The executing units 8–11 outputs the execution results to the execution order management circuit 17, which writes them directly into the register file 19, as it identifies them with the instructions under the non-speculative execution by their identifiers "0". Until a branch instruction is detected, the processor repeats the steps (1)–(3).

(4) After the issuance, Instructions N–2 and N+2 are left in the instruction decoding buffer 6. The data transfer controlling circuit 32 reads out following instructions in sequential from the instruction fetch buffer 3, and sends them to the instruction decoding buffer 6 until the branch instruction detecting circuit 31 detects Instruction Bcc_i. Upon the detection, the data transfer controlling circuit 32 reads out the post-branching instructions from the instruction fetch buffer 4 in addition to the succeeding instructions in turn by switching the selector 5, thence sends them alternately to the instruction decoding buffer 6. At the same time, the mode adding circuit 33 adds the code "01" to the succeeding instructions and the code "10" to the post-branching instructions, making the current mode "00" into the modes "01" and "10", respectively. Thus, the instruction decoding buffer 6 stores Instructions as is shown in FIG. 9.

(5) The instruction decoding unit 7 sorts out issuable instructions in the same manner described in the step (2). Since Instruction N–3 is a load instruction that takes two cycles, Instruction N–2 is not issued in the instant cycle due to the data-dependence. Therefore, the instruction issue controlling circuits 40 controls the instruction issuing circuit 39 to issue Instructions N+2, Bcc_i, N+3, and M respectively to the executing unit 11, branch judging circuit 18, executing unit 9, and executing unit 10 after adding the respective identifiers "0", "0", "1", and "1", while clearing these four Instructions from the instruction fetch buffer 6. The second row of the table in FIG. 8 shows which executing units are executing which Instructions.

(6) Each Instruction is executed as follows:

(6 - 1) Upon the receipt of the Instruction N+2, the executing unit 11 sets the corresponding bit in the executing unit management table 12, and executes Instruction N+2, thence sends the execution result to the execution order management circuit 17 while clearing the corresponding bit at the same time. The execution order management circuit 17 directly writes the execution result into the register file 19 as it identifies Instruction N+2 with the instruction under the non-speculative execution by its identifier "0"

(6 - 2) Upon the receipt of Instruction Bcc_i, the branch judging circuit 18 sets condition thereof, while at the same time the instruction issue controlling circuit 40 sets the Instruction's mode "00" in the initial mode holding circuit 14, the kind of Instruction Bcc_i in the speculative execution type holding circuit 15, and the flag indicating that the speculative execution is being proceeded in the speculative execution status indicating circuit 16.

(6 - 3) Upon the receipt of Instruction N+3, the executing unit 9 sets the corresponding bit in the executing unit management table 12, and executes Instruction N+3, thence sends the execution result to the execution order management circuit 17 while clearing the corresponding bit at the same time. The execution order management circuit 17 writes the register number and mode "01" thereof to the instruction execution management buffer 13, as it identifies Instruction N+3 with the instruction under the speculative execution by its identifier "1".

(6 - 4) Upon the receipt of Instruction M, the executing unit 10 sets the corresponding bit in the executing unit management table 12, and executes Instruction M, thence sends the execution result to the execution order management circuit 17 while clearing the corresponding bit at the same time. The execution order management circuit 17 writes the register number and mode "10" thereof to the instruction execution management buffer 13, as it identifies Instruction M with the instruction under the speculative execution by its identifier "1".

(7) The execution order management buffer 13 stores thus far Instructions N+3 and M as is shown in the first to second rows of the table in FIG. 10.

(8) When Instruction N–3 has been completed in the succeeding cycle, the instruction decoding buffer 6 stores Instructions as is shown in FIG. 11. Thus, the instruction issuing circuit 39 issues Instruction N–2, N+4, and M+1. The third row of the table in FIG. 8 shows which executing units 8–11 are executing which Instructions. The execution order management buffer 13 stores thus far Instructions N+3, M, N+4, and M+1 as shown in the first to fourth rows in the table in FIG. 10.

(9) The executing units 8–11 execute the respective Instructions, and clear the corresponding bits when they completes the execution in the executing unit management table 12, upon which the instruction decoding unit 7 issues the following Instructions accordingly.

(10) As can be seen in FIG. 8, the executing unit 9 executes Instruction N–2 that updates the PSR. Thus, the executing unit 9 clears the flag that has been set up in the speculative execution status indication circuit 16 when it completes the execution; however, the speculative execution continues to the fourth row of the table shown in FIG. 8, and the execution order management buffer 13 stores thus far Instructions N+3, M, N+4, M+1, N+5, and M+2 as shown in the first to sixth rows of the table in FIG. 10.

(11) Upon the clearance of the flag in the speculative execution status indicating circuit 16, the branch judging circuit 18 determines whether to branch based on the type of the branch instruction held in the speculative execution type holding circuit 15 and the updated PSR. Assuming that it determines to branch, the speculative execution results of the succeeding instruction sequence stored in the execution order management buffer 13 are no longer necessary, thus, the branch judging circuit 18 adds the code "01" to the initial mode "00" stored in the initial mode holding circuit 14, and clears the execution results of Instructions N+3, N+4, and N+5 accompanied with the modes "01" as can be seen in FIG. 10. Also, it notifies the instruction decoding unit 7 that the processor determines to branch, so that only the post-branching instructions are written into the instruction decoding buffer 6.

(12) Upon the notification, the execution order management circuit 17 forwards the execution results of the post-branching instruction sequence accompanied with the modes "10" from the execution order management buffer 13 into the register file 19, so that corresponding registers therein store these results respectively.

As can be understood from the above explanation, the speculative execution maintains a continuity with the instruction processing to be executed after the processor has determined to branch. Given that the possibility of exploiting these results of the speculative execution is fifty percent, the processor can increase the processing speed.

(Bcc_1 Instruction)

Figure 12:
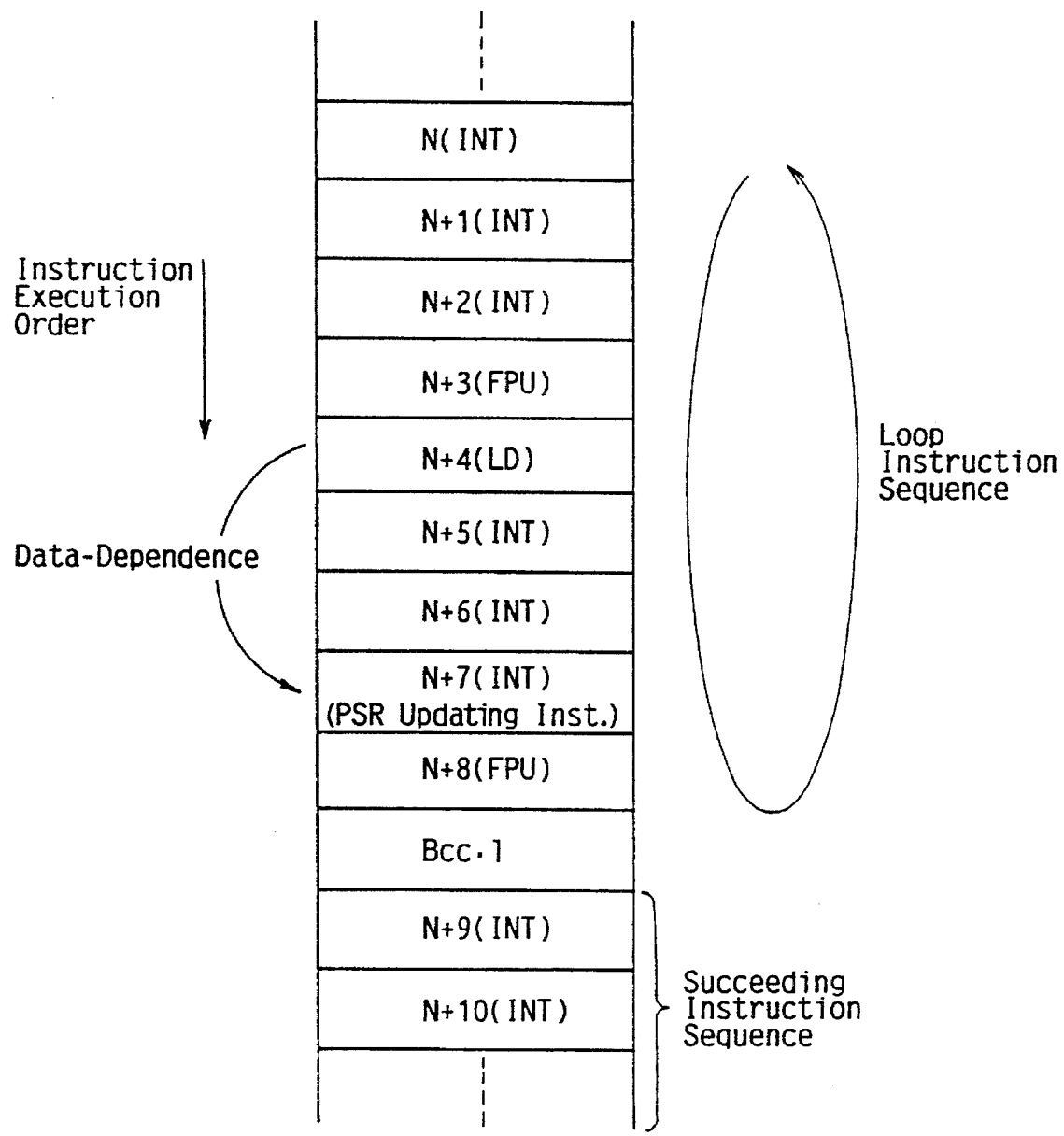
FIG. 12 is the Bcc_1 instruction flow.

As is shown in FIG. 12 where time sequence is indicated in a direction of arrow, Instructions N to N+8 constitute the instruction sequence preceding to the branch instruction, namely Instruction Bcc_1, a loop instruction sequence comprises the post-branching instruction sequence, and Instructions N+9 and N+10 comprises the instruction sequence succeeding to the branch instruction. There is data-dependence between Instruction N+4 and N+7, and the instruction sequence preceding Instruction N is not explained herein as it is irrelevant here.

Assuming that the instruction fetch buffer 3 stores the succeeding instruction sequence while the instruction fetch buffer 4 does the post-branching instruction sequence, the speculative execution for the Bcc_1 instruction is proceeded with the following steps.

Figure 13:
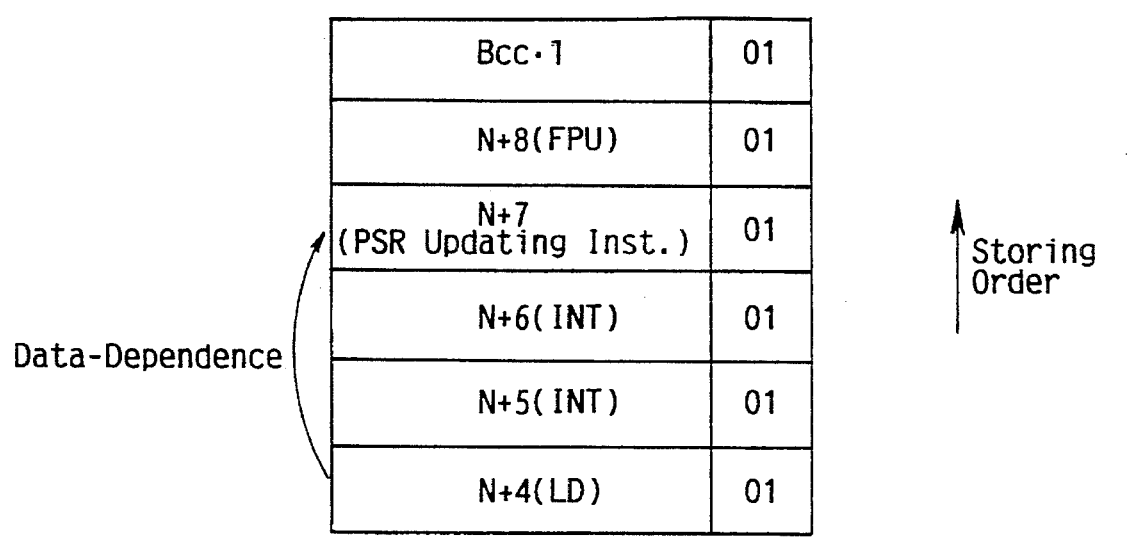

(1) The instruction decoding unit 7 reads out the Instructions N+4 to N+8 from the instruction fetch buffer 3, and sends them to the instruction decoding buffer 6 after adding the mode "01" thereto. The instruction decoding buffer 6 stores Instructions as is shown in FIG. 13

(2) The data-dependence detecting circuit 36 detects data-dependence among Instructions N+4 to N+8, while the scoreboard managing circuit 37 checks which registers are in operation, and the availability detecting circuit 38 detects which executing units are available, and based on which the instruction issue controlling circuit 40 identifies Instructions N+4, N+5, N+6, and N+8 with issuable ones, thence forwards them to the instruction issuing circuit 39 for issuing, while clearing these four Instructions form the instruction decoding buffer 6 upon the issuance together with the identifiers. Being the instruction under the nonspeculative execution, their identifiers are "0". Instruction N+7 is not issued in the instant cycle due to the data-dependence.

The first row of the table in FIG. 14 shows which executing units 8–11 are executing which Instructions. Upon the receipt of these Instructions, the executing units 8–11 set the corresponding bits in the executing unit management table 12, respectively.

The executing units 8–11 output the processing results to the execution order management circuit 17, which writes them directly into the register file 19, as it identifies them with the instructions under the non-speculative execution by their identifiers "0".

(3) Instructions N+7 and Bcc_1 are left in the instruction decoding buffer 6 after the issuance. The data transfer controlling circuit 32 reads out following instruction sequence from the instruction fetch buffer 3. When the branch instruction detecting circuit 31 detects Instruction Bcc_1, the data transfer controlling circuit 32 reads out the post-branching instruction sequence from the instruction fetch buffer 4 in addition to the succeeding instructions in turn by switching the selector 5, thence writes them to the instruction decoding buffer 6. At the same time, the mode adding circuit 33 adds the code "10" to the post-branching instructions, making the current mode "01" into modes "11". Thus, the instruction decoding buffer 6 stores Instructions as is shown in FIG. 15.

(4) The instruction decoding unit 7 identifies issuable instructions in the same manner described in the step (2). Since Instruction N+4 issued to the executing unit 8 is a load instruction that takes two cycles, Instruction N+7 is not issued in the instant cycle due to the data-dependence. Thus, the instruction issue controlling circuit 40 controls the instruction issuing circuit 39 to issue Instructions Bcc_1, N, N+1, and N+3 respectively to the branch judging circuit 18, executing unit 9, executing unit 10, and executing unit 11 after adding the respective identifiers "0", "1", "1" and "1", while clearing them from the instruction decoding buffer 6 upon the issuance. The second row of the table in FIG. 14 shows which executing units are executing which Instructions.

(5) Each Instruction is executed as follows:

(5 - 1) Upon the receipt of Instruction Bcc_1, the branch judging circuit 18 sets conditions thereof, while at the same time the instruction issue controlling circuit 40 sets the mode "01" thereof in the initial mode holding circuit 14, the kind of Instruction Bcc_1 in the speculative execution type holding circuit 15, and the flag indicating that the speculative execution is being proceeding in the speculative execution status indication circuit 16. Henceforward, it remains in the speculative execution status.

(5 - 2) Upon the receipt of the Instruction N, the executing unit 9 sets the corresponding bit in the executing unit management table 12, and executes Instruction N, thence sends the execution result to the execution order management circuit 17 while clearing the corresponding bit at the same time. The execution order management circuit 17 writes the register number and mode "11" thereof to the instruction execution management buffer 13, as it identifies Instructions N with the instruction under the speculative execution by its identifier "1".

(5 - 3) Upon the receipt of the Instruction N+1, the executing unit 10 sets the corresponding bit in the executing unit management table 12, and executes Instruction N+1, thence sends the execution result to the execution order management circuit 17 while clearing the corresponding bit at the same time. The execution order management circuit 17 writes the register number and mode "11" thereof to the instruction execution management buffer 13, as it identifies Instruction N+1 with the one under the speculative execution by its identifier "1".

(5 - 4) Upon the receipt of the Instruction N+3, the executing unit 11 sets the corresponding bit in the executing unit management table 12, and executes Instruction N+3, thence sends the execution result to the execution order management circuit 17 while clearing the corresponding bit at the same time. The execution order management circuit 17 writes the execution result into the instruction execution management buffer 13, as it identifies Instruction N+3 with the instruction under speculative execution by its identifier "1"

(6) The execution order management buffer 13 stores thus far Instructions N, N+1, and N+3 as is shown in the first to third rows of the table in FIG. 16.

(7) When Instruction N has been completed in the preceding cycle, the instruction decoding buffer 6 stores Instructions as is shown in FIG. 17. Thus, the instruction decoding unit 7 issues Instruction N+7 and N+2 through the steps explained above. The third row of the table in FIG. 14 shows which executing units 8–11 are executing which Instructions. The execution order management buffer 13 stores thus far Instructions N, N+1, N+3, N+2 as shown in the first to fourth rows in the table of FIG. 16.

(8) The executing units 8–11 execute the respective Instructions, and clear the corresponding bits when they complete the execution, upon which the instruction decoding unit 7 issues following Instructions accordingly.

(9) As can be seen in FIG. 14, the executing unit 9 executes Instruction N+7 that updates the PSR. Thus, the executing units 9 clears the flag that has been set up in the speculative execution status indication circuit 16 when it has completed the execution; however, the speculative execution continues to the fourth row of the table shown in FIG. 14.

(10) Upon the clearance of the flag in the speculative executing status indication circuit 16, the branch judging circuit 18 determines whether or not to branch based on the instruction type held in the speculative execution type holding circuit 15 and the updated PSR. For convenience, it determines to branch.

(11) The branch judging circuit 18 notifies the execution order management circuit 17 that the processor has determined to branch, hence the speculative execution mode has been terminated, whereby the execution order management circuit 17 transfers the execution results of the post-branching instruction sequence accompanied with the modes "11" to the register file 19 from the execution order management buffer 13.

As can be understood from the above explanation, the speculative execution maintains a continuity with the instruction processing to be executed after the processor has determined to branch. Given that the possibility of exploiting these results of the speculative execution is hundred percent, the processor can increase the processing speed.

Assuming that the branch judging circuit 18 determines not to branch, the steps (11') and (12) follow instead of the step (11).

(11') The branch judging circuit 18 clears all the results of the speculative execution of the post-branching instructions stored in the execution order management buffer 13; it clears the execution results of Instructions N+1, N+3, and N+2 accompanied with the mode "11" as is shown in FIG. 16. Also, it notifies the instruction decoding unit 7 that the processor has determined not to branch, so that only the succeeding instructions are written into the instruction decoding buffer 6.

(12) The branch judging circuit 18 also notifies the execution order management circuit 17 that it has determined not to branch, hence the speculative execution has been terminated, although the execution order management circuit 17 does nothing as all the execution results in the instruction execution order management buffer have been already cleared.

As can be understood from the above explanation, the speculative execution does not contribute to increasing the processing speed when the processor has determined not to branch. However, given that the Bcc_1 instruction itself maintains a small possibility for non-branching, it is rare to see such a case. Thus, when the processing speed for the program is concerned, it can be said that the processor can increase the processing speed. It is needless to say that the speculative execution maintains a continuity with the instruction processing to be executed after the processor has determined not to branch.

(Instruction Bcc_n)

Figure 18:
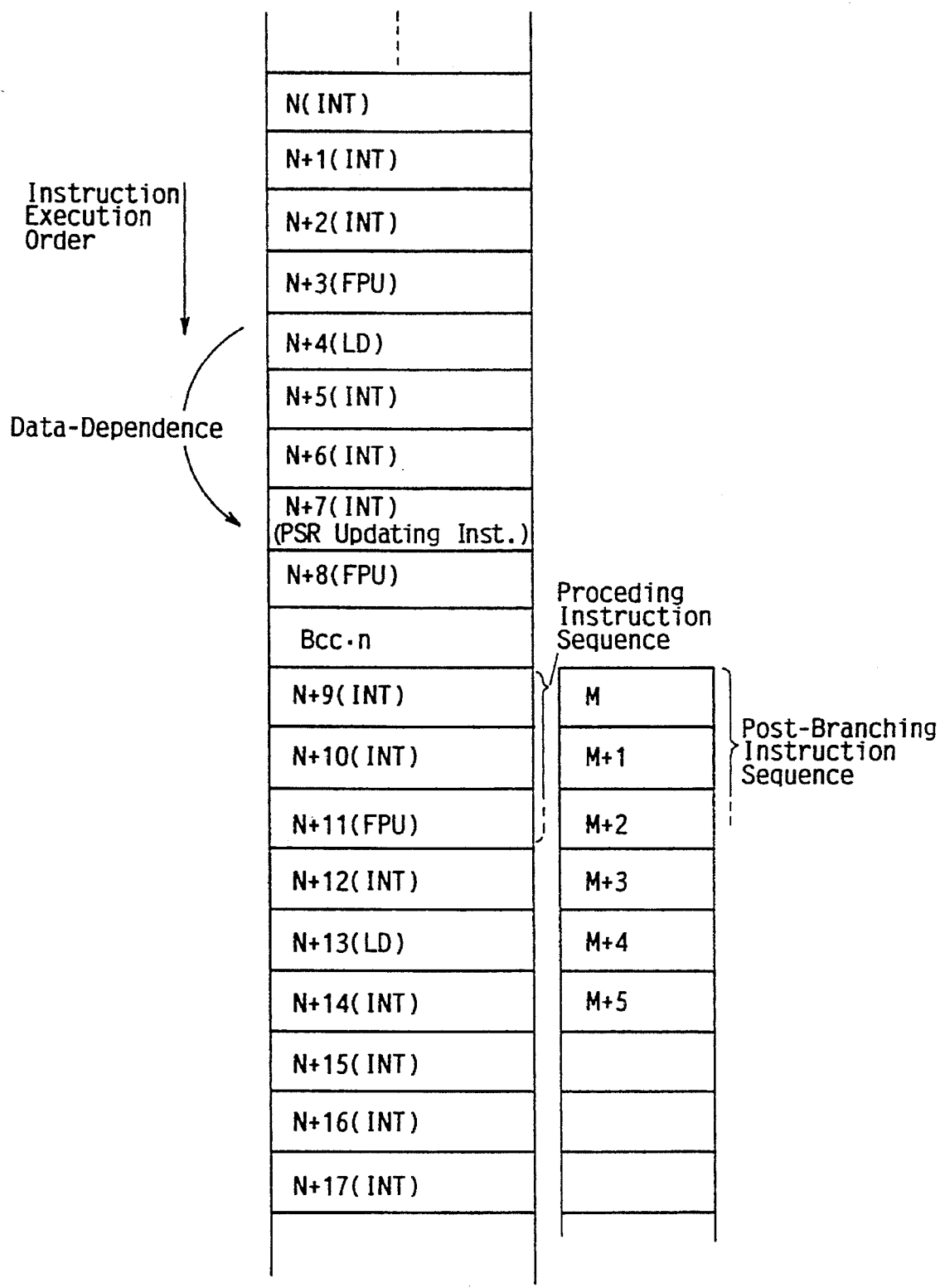
FIG. 18 is the Bcc_n instruction flow.

As is shown in FIG. 18 where time sequence is indicated in a direction of arrow, Instructions N to N+8 constitute the instruction sequence preceding to the branch instruction, namely Instruction Bcc_n, Instruction M to M+5 do the post-branching instruction sequence, Instructions N+9 to N+17 do the instruction sequence succeeding to the branch instruction. There is data-dependence between Instruction N+4 and N+7, and the instruction sequence preceding to Instruction N is not explained herein as it is irrelevant here.

Assuming that the instruction fetch buffer 3 stores the succeeding instruction sequence while the instruction fetch buffer 4 does the post-branching instruction sequence, the speculative execution for the Bcc_n instruction is proceeded with the following steps.

Figure 19:
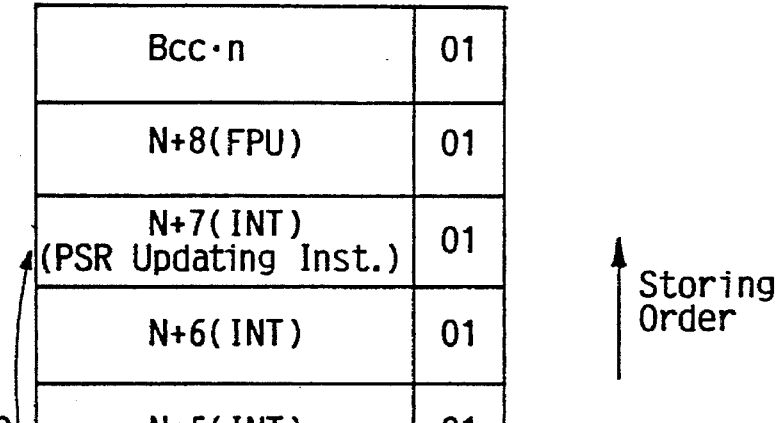
FIG. 19 is the first illustration explaining how instructions are stored in the instruction decoding buffer 6 during the speculative execution for the Bcc_n instruction.

(1) The instruction decoding unit 7 reads out the Instructions N+4 to N+8 from the instruction fetch buffer 3, and sends them to the instruction decoding buffer 6 after adding the mode "01" thereto. The instruction decoding buffer 6 stores Instructions as is shown in FIG. 19.

(2) The data-dependence detecting circuit 36 detects data-dependence among Instructions N+4 to N+8, while the scoreboard managing circuit 37 checks which registers are in operation, and the availability detecting circuit 38 detects which executing units are available, and based on which the instruction issue controlling circuit 40 identifies Instructions N+4, N+5, N+6, and N+8 with issuable ones, thence forwards them to the instruction issuing circuit 39 for issuing, while clearing these four Instructions form the instruction decoding buffer 6 upon the issuance together with the identifiers. Being the instruction under the non-speculative execution, their identifiers are "0". Instruction N+7 is not issued in the instant cycle due to the data-dependence.

The first row of the table in FIG. 20 shows which executing units 8–11 are executing which Instructions. Upon the receipt of these Instructions, the executing units 8–11 set the corresponding bits in the executing unit management table 12, respectively.

The executing units 8–11 output the execution results to the execution order management circuit 17, which writes them directly into the register file 19, as it identifies them with the instructions under the non-speculative execution by their identifiers "0".

(3) Instructions N+7 and Bcc_n are left in the instruction decoding buffer 6 after the issuance. The data transfer controlling circuit 32 reads out following instruction sequence from the instruction fetch buffer 3. When the branch instruction detecting circuit 31 detects Instruction Bcc_n, the data transfer controlling circuit 32 continuously reads out the succeeding instruction sequence from the instruction fetch buffer 3, thence writes them to the instruction decoding buffer 6. At the same time, the mode adding circuit 33 adds the code "01" thereto, making the current mode "01" into modes "10". Thus, the instruction decoding buffer 6 stores Instructions as is shown in FIG. 21.

(4) The instruction decoding unit 7 identifies issuable instructions in the same manner described in the step (2). Since Instruction N+4 issued to the executing unit 8 is a load instruction that takes two cycles, Instruction N+7 is not issued in the instant cycle due to the data-dependence. Thus, the instruction issue controlling circuit 40 controls the instruction issuing circuit 39 to issue Instructions Bcc_n, N+9, N+10, and N+11 respectively to the branch judging circuit 18, executing unit 9, executing unit 10, and executing unit 11 after adding the respective identifiers "0", "1", "1", and "1", while clearing them from the instruction decoding buffer 6 upon the issuance. The second row of the table in FIG. 20 shows which executing units are executing which Instructions.

(5) Each Instruction is executed as follows:

(5 - 1) Upon the receipt of Instruction Bcc_n, the branch judging circuit 18 sets conditions thereof, while at the same time the instruction issue controlling circuit 40 sets the mode "01" thereof in the initial mode holding circuit 14, the kind of Instruction Bcc_n in the speculative execution type holding circuit 15, and the flag indicating that the speculative execution is being proceeding in the speculative execution status indication circuit 16. Henceforward, it remains in the speculative execution status.

(5 - 2) Upon the receipt of the Instruction N+9, the executing unit 9 sets the corresponding bit in the executing unit management table 12, and executes Instruction N+9, thence sends the execution result to the execution order management circuit 17 while clearing the corresponding bit at the same time. The execution order management circuit 17 writes the register number and mode "10" thereof to the instruction execution management buffer 13, as it identifies Instructions N+9 with the instruction under the speculative execution by its identifier "1".

(5 - 3) Upon the receipt of the Instruction N+10, the executing unit 10 sets the corresponding bit in the executing unit management table 12, and executes Instruction N+10, thence sends the execution result to the execution order management circuit 17 while clearing the corresponding bit at the same time. The execution order management circuit 17 writes the register number and mode "11" thereof to the instruction execution management buffer 13, as it identifies Instruction N+10 with the one under the speculative execution by its identifier "1".

(5 - 4) Upon the receipt of the Instruction N+11, the executing unit 11 sets the corresponding bit in the executing unit management table 12, and executes Instruction N+11, thence sends the execution result to the execution order management circuit 17 while clearing the corresponding bit at the same time. The execution order management circuit 17 writes the execution result into the instruction execution management buffer 13, as it identifies Instruction N+11 with the instruction under speculative execution by its identifier "1"

(6) The execution order management buffer 13 stores thus far Instructions N+9, N+10, and N+11 as is shown in the first to third rows of the table in FIG. 16.

(7) When Instruction N+4 has been completed in the preceding cycle, the instruction decoding buffer 6 stores Instructions as is shown in FIG. 23. Thus, the instruction decoding unit 7 issues Instruction N+7, N+13, and N+12 through the steps explained above. The third row of the table in FIG. 20 shows which executing units 8–11 are executing which Instructions. The execution order management buffer 13 stores thus far Instructions N+7, N+12, N+13, N+14, N+15, and N+16 as shown in the first to fourth rows in the table of FIG. 23.

(8) The executing units 8–11 execute the respective Instructions, and clear the corresponding bits when they complete the execution, upon which the instruction decoding unit 7 issues following Instructions accordingly.

(9) As can be seen in FIG. 20, the executing unit 9 executes Instruction N+7 that updates the PSR. Thus, the executing units 9 clears the flag that has been set up in the speculative execution status indication circuit 16 when it has completed the execution; however, the speculative execution continues to the fourth row of the table shown in FIG. 20.

(10) Upon the clearance of the flag in the speculative executing status indication circuit 16, the branch judging circuit 18 determines whether or not to branch based on the instruction type held in the speculative execution type holding circuit 15 and the updated PSR. For convenience, it determines not to branch.

(11) The branch judging circuit 18 notifies the execution order management circuit 17 that the processor has determined not to branch, hence the speculative execution mode has been terminated, whereby the execution order management circuit 17 transfers the execution results of the succeeding instruction sequence accompanied with the modes "10" to the register file 19 from the execution order management buffer 13.

As can be understood from the above explanation, the speculative execution maintains a continuity with the instruction processing to be executed after the processor has determined not to branch. Given that the possibility of exploiting these results of the speculative execution is hundred percent, the processor can increase the processing speed.

Assuming that the branch judging circuit 18 determines to branch, the steps (11') and (12) follow instead of the step (11).

Figure 22:
FIG. 22 is a view how the execution results are stored in the execution order management buffer 13 during the speculative execution for the Bcc_n instruction.

(11') The branch judging circuit 18 clears all the results of the speculative execution of the succeeding instructions stored in the execution order management buffer 13; it clears the execution results of Instructions N+9, N+10, N+11, N+12, and N+13 accompanied with the mode "10" as is shown in FIG. 22. Also, it notifies the instruction decoding unit 7 that the processor has determined to branch, so that only the post-branching instructions are written into the instruction decoding buffer 6.

(12) The branch judging circuit 18 also notifies the execution order management circuit 17 that it has determined to branch, hence the speculative execution has been terminated, although the execution order management circuit 17 does nothing as all the execution results in the instruction execution order management buffer have been already cleared.

As can be understood from the above explanation, the speculative execution does not contribute to increasing the processing speed when the processor has determined to branch. However, the Bcc_n instruction itself maintains a small possibility for branching, it is rare to see such a case. Thus, when the processing speed for the program is concerned, it can be said that the processor can increase the processing speed. It is needless to say that the speculative execution maintains a continuity with the instruction processing to be executed after the processor has determined not to branch.

In summary, the processor of the present invention increases the processing speed by proceeding right speculative execution for the right branch instructions based on their possibilities for branching and non-branching, namely divided into Bcc_1, Bcc_, and Bcc_n instructions.

It applies the speculative execution for Bcc_1 instruction to a for-loop branch instruction in the programming language C of which compiler has a good possibility for branching, while it applies the one for Bcc_i instruction to an if-then-else branch instruction that maintains substantially equal possibilities for branching and non-branching. It further increases the processing speed, when it is designed to execute as many instruction sequences as possible in a loop in parallel. In particular, such an effect is obvious with the if-then-else branch instruction where the speculative execution based on the prediction results a great time loss when the prediction turns out wrong. In addition, there is a case when the processor must execute only one instruction at a time due to data-dependence, thus, such a prediction does not necessarily increase the efficiency in parallel processing. Therefore, it can be said that it is most advantageous when both the succeeding and post-branching instruction sequences are speculatively executed.

In the embodiment, the executing unit maintains one pipe line for convenience' sake; however, the number of pipe lines are changed by renewing the executing unit execution management table 12.

The succeeding and post-branching instructions are not necessarily stored alternatively into the instruction fetch buffer 6. These instructions may be stored arbitrary order, and the instruction fetch buffers 3 and 4 may directly transfer the instructions to the corresponding decoders in the instruction decoding circuit 34 through the selector 5.

Although the executing units 8–11 differ in their function, they may be identical in construction hence the function.

In order to distinguish the register file 19 from the execution order management buffer 13, the identifiers are added to the instructions upon their issuance, but the addresses of the program counter 21 may used as the identifiers. As well, the instruction decoding unit 7 may designate the execution order management 17 to where the instructions are to be stored.

The rule of how to add the mode to the instructions is not restricted to the one explained herein.

More than one branch instructions are speculatively executed when the speculative execution status indication circuit is designed to indicate more than one status. Likewise, a plurality of branch instructions can be speculatively executed when the sufficient number of the modes, initial mode holding circuits 14, speculative execution type holding circuits 15, speculative execution status indication circuits 16, and branch judging circuit 18 are provided, making a correlation between the instructions that update PSR and branch instructions specific.

The instruction decoding unit 7 may issue the instructions by so-called in-order method instead of out-of-order method employed herein.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A processor including a plurality of executing units for processing in parallel a plurality of instructions in an instruction sequence stored in its memory, the processor comprising:

instruction type distinguishing means for distinguishing a type of a conditional branch instruction included in the unexecuted instruction sequence, the condition of the conditional branch instruction depending on a prior instruction in the instruction sequence;

instruction parallel-issuing means for issuing in parallel for execution by executing units one of a first instruction sequence comprising an instruction sequence logically following the conditional branch instruction if branching does not occur, a second instruction sequence comprising an instruction sequence logically following the conditional branch instruction if branching does occur, and both of said first instruction sequence and said second instruction sequence, said instruction sequences being executed before a decision whether or not to branch is determined, a choice between one of the first, the second and both of said first instruction sequence and said second instruction sequence depending on the type of the conditional branch instruction;

a first instruction fetch buffer for temporarily storing the first instruction sequence:

a second instruction fetch buffer for temporarily storing the second instruction sequence:

instruction fetching means for fetching instructions stored in the memory and selectively writing them into the first instruction fetch buffer and the second instruction fetch buffer;

branching determining means for determining whether to branch after the prior instruction has been executed; and execution result managing means for identifying whether the execution results of the instruction sequences are valid based on the results of the branching determining means.

2. The processor of claim 1, wherein the instruction type distinguishing means distinguishes a first type of conditional branch instruction from the others, of which possibilities for branching and non-branching are substantially equal;

wherein the instruction parallel-issuing means issues both the first instruction sequence and the second instruction sequence in parallel when the conditional branch instruction is one of the first type of instructions, and issues only one of the first instruction sequence and the second instruction sequence to the executing units in parallel when the conditional branch instruction is not one of the first type of instructions; and wherein the execution results managing means makes one of the execution results of the first instruction sequence and the second instruction sequence valid and the other invalid based on the result of the branching determining means when the conditional branch instruction is one of the first type of instructions, and makes the execution results of the issued instruction sequence valid or invalid based on the result of the branching determining means when the conditional branch instruction is not one of the first type of instructions.

3. The processor of claim 2, wherein the instruction type distinguishing means further distinguishes a second type of conditional branch instruction that has a good possibility for branching compared with the first type of instructions and a third type of conditional branch instruction that has a good possibility for non-branching compared with the first type of instruction; and wherein the instruction parallel-issuing means issues the second instruction sequence to the executing units in parallel when the conditional branch instruction is one of the second type of instructions, and issues the first instruction sequence to the executing units in parallel when the conditional branch instruction is one of the third type of instructions.

4. The processor of claim 1, wherein the instruction fetching means includes:

a program counter for outputting read-out addresses to the memory while incrementing its address;

conditional branch instruction detecting means for detecting a conditional branch instruction among the instructions fetched from the memory;

calculating means for calculating a branch address based on the conditional branch instruction detected by the conditional branch instruction detecting means; and fetch controlling means for writing the instructions into the first instruction fetch buffer while incrementing its address every time an instruction is fetched from the memory, and for writing the first instruction sequence into the first instruction fetch buffer and the second instruction sequence into the second instruction fetch buffer by first writing the branch address calculated by the calculating means into the program counter when the conditional branch instruction is detected.

5. The processor of claim 1, wherein the instruction parallel-issuing means includes:

a plurality of decoding means for decoding the instructions and thence generating control signals outputted to the executing units;

transfer controlling means for transferring the instructions in the first instruction fetch buffer and the second instruction fetch buffer to the plurality of decoding means, one instruction to one decoding means; and mode adding means for adding a mode to each instruction transferred by the transfer controlling means, the mode indicating which instruction sequence the instruction belongs to by adding one mode to the instructions of the first instruction sequence and another mode to the instructions of the second instruction sequence.

6. The processor of claim 5, wherein each mode added by the mode adding means is 2-bit data, the mode adding means adding a first value to the current mode of the conditional branch instruction for the first instruction sequence, and adding a second value to the current mode of the conditional branch instruction for the second instruction sequence.

7. The processor of claim 5, wherein the other instruction on which the conditional branch instruction depends is an instruction that updates a PSR, and the branching determining means detects the execution of the instruction that updates the PSR and refers to the execution result.

8. The processor of claim 5, the processor further comprising:

data-dependence detecting means for detecting data-dependence among a plurality of the decoded instructions by referring to a plurality of decoding results of the decoding means;

scoreboard managing means for managing which registers are in operation for the instructions being executed by the executing units;

availability detecting means for detecting the availability of the executing units; and instruction issuance allowing means for allowing the instruction parallel-issuing means to issue instructions identified with the issuable ones based on the detecting result of the data-dependence detecting means, the status of the scoreboard managing means, and the detecting result of the availability detecting means into the executing units, while allowing the instruction parallel-issuing means to issue the conditional branch instruction to the branching determining means.

9. The processor of claim 8, wherein the instruction issuance allowing means identifies instructions are issuable ones by confirming that the decoding results of the plurality of the decoding means have no data-dependence among each other from the detecting result of the data-dependence detecting means, that the registers designated by an operand of the decoding results are not being in operation for the instructions being executed by the executing units from the data in the scoreboard managing means, and that the executing units for the instructions are available from the detecting result of the availability detecting means.

10. The processor of claim 8, the processor further comprising:

an execution unit managing table for holding data for each executing unit showing whether the unit is executing the instructions, the data being referred by the availability detecting means; and a scoreboard for holding data showing which registers are in operation for the instructions being executed by the executing units, the data being referred by the scoreboard managing means.

11. The processor of claim 8, wherein the execution result managing means includes:

initial mode holding means for holding the mode of the conditional branch instruction issued by the instruction parallel-issuing means as an initial mode;

speculative execution type holding means for holding the type of the conditional branch instruction issued by the instruction parallel-issuing means;

speculative execution status indicating means for indicating by means of a flag that the condition of the conditional branch instruction issued by the instruction parallel-issuing means has not been decided; and wherein the instruction parallel-issuing means issues the conditional branch instruction to the branching determining means, while at the same time it sets the mode thereof in the initial mode holding means, the type thereof in the speculative execution type holding means, and the flag in the speculative status indicating means.

12. The processor of claim 11, wherein the execution result managing means includes temporary for storing means storing a set of the execution results of the executing units, the modes of the instructions, and data as to where these execution results are to be stored.

13. The processor of claim 12, wherein the temporary storing means stores register numbers of the execution results when the results are to be stored into registers, and stores memory addresses thereof when they are to be stored in the memory.

14. The processor of claim 12, wherein the branching determining means resets the flag in the speculative execution status indicating means upon its determination; and the execution result managing means identifies whether the execution results in the temporary storing means are valid results by referring to the initial mode holding means based on the detecting result of the branching determining means and speculative execution type holding means, thence, transfers only the valid execution results to their storage location while clearing any invalid execution results.

15. The processor of claim 3 further comprising an instruction fetching means for fetching instructions stored, the instruction fetching means comprising:

a program counter for outputting read-out addresses to the memory while incrementing its address;

conditional branch instruction detecting means for detecting a conditional branch instruction among the instructions fetched from the memory;

calculating means for calculating a branch address based on the conditional branch instruction detected by the conditional branch instruction detecting means; and fetch controlling means including a first instruction fetch buffer and a second instruction fetch buffer for writing the instructions into the first instruction fetch buffer while incrementing its address every time an instruction is fetched from the memory, and for writing the first instruction sequence into the first instruction fetch buffer and the second instruction sequence into the second instruction fetch buffer by writing the branch address calculated by the calculating means into the program counter when the conditional branch instruction is detected;

wherein the instruction parallel-issuing means includes:

a plurality of decoding means for decoding the instructions and thence generating control signals outputted to the executing units;

transfer controlling means for transferring the instructions in the first instruction fetch buffer and the second instruction fetch buffer to the plurality of decoding means, one instruction to one decoding means;

mode adding means for adding a mode to each instruction transferred from the transfer controlling means, which indicates which instruction sequence the instruction belongs to by adding one mode to the first instruction sequence and another mode to the second instruction sequence;

wherein the processor further comprises:

data-dependence detecting means for detecting data-dependence among a plurality of the decoded instructions by referring to a plurality of decoding results of the decoding means;

scoreboard managing means for managing which registers are in operation for the instructions being executed by the executing units;

availability detecting means for detecting the availability of the executing units; and instruction issuance allowing means for allowing the instruction parallel-issuing means to issue instructions identified as issuable ones based on the detecting result of the data-dependence detecting means, the status of the scoreboard managing means, and the detecting result of the availability detecting means into the executing units, while allowing the instruction parallel-issuing means to issue the conditional branch instruction to the branching determining means;

wherein the execution result managing means includes:

temporary storing means for storing a set of the execution results of the executing units, the modes of the instructions, and data as to where these execution results are to be stored;

initial mode holding means for holding the mode of the conditional branch instruction issued by the instruction parallel-issuing means as an initial mode;

speculative execution type holding means for holding the type of the conditional branch instruction issued by the instruction parallel-issuing means; and speculative execution status indicating means for indicating by means of a flag that the condition of the conditional branch instruction issued by the instruction parallel-issuing means has not been decided;

wherein the instruction parallel-issuing means issues the conditional branch instruction to the branching determining means, while at the same time it sets the mode thereof in the initial mode holding means, the type thereof in the speculative execution type holding means, the type thereof in the speculative execution type holding means, and the flag in the speculative status indicating means; and wherein the functions of the execution results managing means comprise:

upon receipt of the result from the branching determining means, clearing the execution results of the first instruction sequence by referring to the initial mode while transferring the execution results of the second instruction sequence to their storage location when the speculative execution type holding means holds the first type of the instructions and the processor has determined to branch;

clearing the execution results of the second instruction sequence by referring to the initial mode while transferring the execution results of the first instruction sequence to their storage location when the speculative execution type holding means holds the first type of instruction and the processor determines not to branch;

transferring the execution results of the second instruction sequence to their storage location by referring to the initial mode when the speculative execution type holding means holds the second type of instruction and the processor has determined to branch;

clearing the execution results of the second instruction sequence from the temporary storing means when the speculative execution type holding means holds the second type of instruction and the processor determines not to branch;

transferring the execution results of the first instruction sequence to their storage location by referring to the initial mode when the speculative execution type holding means holds the third type of instruction and the processor has determined not to branch; and clearing the execution result of the first instruction sequence from the temporary storing means when the speculative execution type holding means holds the third type of instruction and the processor determines to branch.

16. A processor including a plurality of executing units for processing in parallel a plurality of instructions in an instruction sequence stored in its memory, the processor comprising:

instruction type distinguishing means for distinguishing a type of a conditional branch instruction included in the unexecuted instruction sequence, the condition of the conditional branch instruction depending on another instruction;

instruction parallel-issuing means for issuing in parallel to executing units a first instruction sequence comprising an instruction sequence to be executed following the conditional branch instruction and/or a second instruction sequence comprising an instruction sequence to be executed after the branching before a decision whether or not to branch is determined, a choice between the first and/or the second instruction sequence depending on the type of the conditional branch instruction, the instruction parallel-issuing means comprising:

a plurality of decoding means for decoding the instructions and thence generating control signals outputted to the executing units;

transfer controlling means for transferring the instructions in the first instruction fetch buffer and the second instruction fetch buffer to the plurality of decoding means, one instruction to one decoding means;

mode adding means for adding a mode to each instruction transferred by the transfer controlling means, the mode indicating which instruction sequence the instruction belongs to by adding one mode to the instructions of the first instruction sequence and another mode to the instructions of the second instruction sequence;

branching determining means for determining whether to branch when the other instruction is executed;

execution result managing means for identifying whether the execution results of the instruction sequences are valid based on the results of the branching determining means;

a first instruction fetch buffer for temporarily storing the first instruction sequence;

a second instruction fetch buffer for temporarily storing the second instruction sequence; and instruction fetching means for fetching instructions stored in the memory and selectively writing them into the first instruction fetch buffer and the second instruction fetch buffer.

17. The processor of claim 16, wherein each mode added by the mode adding means is 2-bit data, the mode adding means adding a first value to the current mode of the conditional branch instruction for the first instruction sequence, and adding a second value to the current mode of the conditional branch instruction for the second instruction sequence.

18. The processor of claim 16, wherein the other instruction on which the conditional branch instruction depends is an instruction that updates a PSR, and the branching determining means detects the execution of the instruction that updates the PSR and refers to the execution results.

19. The processor of claim 16 further comprising:

data-dependence detecting means for detecting data-dependence among a plurality of the decoded instructions by referring to a plurality of decoding results of the decoding;

scoreboard managing means for managing which registers are in operation for the instructions being executed by the executing units;

availability detecting means for detecting the availability of the executing units; and instruction issuance allowing means for allowing the instruction parallel-issuing means to issue instructions identified with the issuable ones based on the detecting result of the data-dependence detecting means, the status of the scoreboard managing means, and the detecting result of the availability selecting means into the executing units, while allowing the instruction parallel-issuing means to issue the conditional branch instruction to the branching determining means.

20. The processor of claim 19, wherein the instruction issuance allowing means identifies instruction as issuable by confirming that the decoding results of the plurality of the decoding means have no data-dependence among each other from the detecting result of the data-dependence detecting means, that the registers designated by an operand of the decoding results are not in operation for the instructions being executed y the executing units from the data in the scoreboard managing means, and that the executing units for the instructions are available from the detecting result of the availability detecting means.

21. The processor of claim 19, the processor further comprising:

an execution unit managing table for holding data for each executing unit showing whether the unit is executing the instructions, the data being referred by the availability detecting means; and a scoreboard for holding data showing which registers are in operation for the instructions being executed by the executing units, the data being referred by the scoreboard managing means.

22. The processor of claim 19, wherein the execution result managing means includes:

initial mode holding means for holding the mode of the conditional branch instruction issued by the instruction parallel-issuing means as an initial mode;

speculative execution type holding means for holding the type of the conditional branch instruction issued by the instruction parallel-issuing means;

speculative execution status indicating means for indicating by means of a flag that the condition of the conditional branch instruction issued by the instruction parallel-issuing means has not been decided; and wherein the instruction parallel-issuing means issues the conditional branch instruction to the branching determining means, while at the same time it sets the mode thereof in the initial mode holding means, the type thereof in the speculative execution type holding means, and the flag in the speculative status indicating means.

23. The processor of claim 22, wherein the execution result managing means includes temporary storing means for storing a set of the execution results of the execution units, the modes of the instructions, and data as to where those execution results are to be stored.

24. The processor of claim 23, wherein the temporary storing means stores register numbers of the execution results when the results are to be stored into registers, and stores memory addresses thereof when they are to be stored in the memory.

25. The processor of claim 23, wherein the branching determining means resets the flag in the speculative execution status indicating means upon its determination; and the execution result managing means identifies whether the execution results in the temporary storing means are valid results by referring to the initial mode holding means based on the detecting result of the branching determining means and speculative execution type holding means, thence, transfers only the valid execution results to their storage location while clearing any invalid execution results.

26. A processor including a plurality of executing units for processing in parallel a plurality of instructions in an instruction sequence stored in its memory, the processor comprising:

instruction type distinguishing means for distinguishing a type of a conditional branch instruction included in the unexecuted instruction sequence, the condition of the conditional branch instruction depending on another instruction, the instruction type distinguishing means distinguishing a first type of conditional branch instruction for which the possibilities of branching and non-branching are substantially equal, a second type of instruction for which the possibility for branching is good as compared to the first type, and a third type of instruction for which the possibility of non-branching is good as compared to the first type;

instruction parallel-issuing means for issuing in parallel to executing units a first instruction sequence comprising an instruction sequence to be executed following the conditional branch instruction and/or a second instruction sequence comprising an instruction sequence to be executed after the branching before a decision whether or not to branch is determined, a choice between the first and/or the second instruction sequence depending on the type of the conditional branch instruction, both the first instruction sequence and the second instruction sequence being issued in parallel when the conditional branch instruction is of the first type, only the second instruction sequence being issued in parallel when the conditional branch instruction is of the second type, and only the first instruction sequence being issued in parallel when the conditional branch instruction is of the third type, the instruction parallel-issuing means comprising:

a plurality of decoding means for decoding the instructions and thence generating control signals outputted to the executing units;

transfer controlling means for transferring the instructions in the first instruction fetch buffer and the second instruction fetch buffer to the plurality of decoding means, one instruction to one decoding means;

mode adding means for adding a mode to each instruction transferred from the transfer controlling means, which indicates which instruction sequence the instruction belongs to by adding one mode to the first instruction sequence and another mode to the second instruction sequence;

an instruction fetching means for fetching instructions stored in memory, the instruction fetching means comprising:

a program counter for outputting read-out addresses to the memory while incrementing its address;

conditional branch instruction detecting means for detecting a conditional branch instruction among the instructions fetched from the memory;

calculating means for calculating a branch address based on the conditional branch instruction detected by the conditional branch instruction detecting means; and fetch controlling means including a first fetch buffer and a second fetch buffer for writing the instructions into the first instruction fetch buffer while incrementing its address every time an instruction is fetched from the memory, and for writing the first instruction sequence into the first instruction fetch buffer and the second instruction sequence into the second instruction fetch buffer by writing the branch address calculated by the calculating means into the program counter when the conditional branch instruction is detected;

branching determining means for determining whether to branch when the other instruction is executed; and execution result managing means for identifying whether the execution results of the instruction sequences are valid based on the results of the branching determining means, the execution result managing means making one of the execution results of the first and the second instruction sequences valid and the other invalid based on the result of the branching determining means when the conditional branch instruction is of the first type, and making the execution results of the issued instruction sequence valid or invalid based on the result of the branching determining means when the conditional branch instruction is not one of the first type, the execution result managing means comprising:

temporary storing means for storing a set of the execution results of the executing units, the modes of the instructions, and data as to where these execution results are to be stored;

initial mode holding means for holding the mode of the conditional branch instruction issued by the instruction parallel-issuing means as an initial mode;

speculative execution type holding means for holding the type of the conditional branch instruction issued by the instruction parallel-issuing means; and speculative execution status indicating means for indicating by means of a flag that the condition of the conditional branch instruction issued by the instruction parallel-issuing means has not been decided;

data-dependence detecting means for detecting data-dependence among a plurality of the decoded instructions by referring to a plurality of decoding results of the decoding means, the execution result managing means functions comprising:

interacting with the instruction parallel-issuing means so that when the parallel-issuing means issues the conditional branch instruction to the branching determining means, at the same time it sets the mode thereof in the initial mode holding means, the type thereof in the speculative execution type holding means, the type thereof in the speculative execution type holding means, and the flag in the speculative status indicating means;

upon receipt of the result from the branching determining means clearing the execution results of the first instruction sequence by referring to the initial mode while transferring the execution results of the second instruction sequence their storage location when the speculative execution type holding means holds the first type of the instructions and the processor has determined to branch;

upon receipt of the result from the branch determining means clearing the execution results of the second instruction sequence while transferring the execution results of the first instruction sequence to their storage location when the speculative execution type holding means holds the first type of instruction and the processor determines not to branch;

transferring the execution results of the second instruction sequence to their storage location by referring to the initial mode when the speculative execution type holding means holds the second type of instruction and the processor has determined to branch;

clearing the execution results of the second instruction sequence from the temporary storing means when the speculative execution type holding means holds the second type of instruction and the processor determines not to branch;

transferring the execution results of the first instruction sequence to their storage location by referring to the initial mode when the speculative execution type holding means holds the third type of instruction and the processor has determined not to branch; and clearing the execution result of the first instruction sequence from the temporary storing means when the speculative execution type holding means holds the third type of instruction and the processor determines to branch scoreboard managing means for managing which registers are in operation for the instructions being executed by the executing units;

availability detecting means for detecting the availability of the executing units; and instruction issuance allowing means for allowing the instruction parallel-issuing means to issue instructions identified as issuable ones based on the detecting result of the data-dependence detecting means, the status of the scoreboard managing means, and the detecting result of the availability detecting means into the executing units, while allowing the instruction parallel-issuing means to issue the conditional branch instruction to the branching determining means.

27. A processor including a plurality of executing units for processing in parallel a plurality of instructions in an instruction sequence stored in its memory, the processor comprising:

instruction type distinguishing means for distinguishing types of conditional branch instructions included in the unexecuted instruction sequence, the condition of each conditional branch instruction depending on a prior instruction in the instruction sequence, the instruction type distinguishing means distinguishing a first type of conditional branch instruction from among other types of conditional branch instructions, probabilities of branching and non-branching for the first type of conditional branch instruction being substantially equal;

instruction parallel-issuing means for issuing in parallel to executing units one of a first instruction sequence comprising an instruction sequence logically following the conditional branch instruction if branching does not occur, a second instruction sequence comprising an instruction sequence logically following the conditional branch instruction if branching does occur, and both of said first instruction sequence and said second instruction sequence, said instruction sequences being issued before a decision whether or not to branch is determined, a choice between one of the first, the second and both of said first instruction sequence and said second instruction sequence depending on the type of the conditional branch instruction, both the first instruction sequence and the second instruction sequence being issued in parallel when the conditional branch instruction is one of the first type of conditional branch instructions, and only one of the first instruction sequence and the second instruction sequence being issued to the executing units when the conditional branch instruction is not one of the first type of conditional branch instructions;

branching determining means for determining whether to branch after the prior instruction has been executed; and execution result managing means for making one of the execution results of the first instruction sequence and the second instruction sequence valid and the other invalid based on the result of the branching determining means when the conditional branch instruction is one of the first type of conditional branch instructions, and for making the execution results of the issued instruction sequence valid or invalid based on the result of the branching determining means when the conditional branch instruction is not one of the first type of conditional branch instructions.

28. The processor of claim 27, wherein the instruction type distinguishing means further distinguishes a second type of conditional branch instruction that has a good probability of branching compared with the first type of instruction and a third type of conditional branch instruction that has a good probability of non-branching compared with the first type of instruction; and wherein the instruction parallel-issuing means issues the second instruction sequence to the executing units when the conditional branch instruction is one of the second type of conditional branch instructions, and issues the first instruction sequence to the executing units when the conditional branch instruction is one of the third type of conditional branch instructions.

* * * * *

UNITED STATES PATENT OFFICE
CERTIFICATE OF CORRECTION

Patent No. 5,511,172        Dated April 23, 1996

Inventor(s)  Kozo Kimura et al.

It is certified that error appears in the above-identified patent and that said Letters Patent is hereby corrected as shown below:

On the cover page:

Item: [75] Inventors, delete "Kosuki" and insert --Kosuke--.

Signed and Sealed this

Thirteenth Day of August, 1996

Attest:

BRUCE LEHMAN

Attesting Officer        Commissioner of Patents and Trademarks